US008581700B2

(12) United States Patent
Kawamura et al.

(10) Patent No.: US 8,581,700 B2
(45) Date of Patent: Nov. 12, 2013

(54) WEARABLE DEVICE

(75) Inventors: Takashi Kawamura, Kyoto (JP);
Masayuki Misaki, Hyogo (JP);
Ryouichi Kawanishi, Osaka (JP);
Masaki Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1255 days.

(21) Appl. No.: 12/279,011

(22) PCT Filed: Feb. 21, 2007

(86) PCT No.: PCT/JP2007/053187
§ 371 (c)(1),
(2), (4) Date: Aug. 11, 2008

(87) PCT Pub. No.: WO2007/105436
PCT Pub. Date: Sep. 20, 2007

(65) Prior Publication Data
US 2009/0058611 A1 Mar. 5, 2009

(30) Foreign Application Priority Data
Feb. 28, 2006 (JP) .................................. 2006-053030

(51) Int. Cl.
*H04Q 5/22* (2006.01)
(52) U.S. Cl.
USPC ......... 340/10.1; 340/7.57; 340/10.2; 340/8.1; 340/12.24; 340/12.23; 340/539.11; 340/573.1; 345/2.1; 381/315; 381/327; 381/376; 381/378
(58) Field of Classification Search
USPC .............. 340/7.57, 10.2, 10.1, 12.23, 539.11, 340/573.1, 8.1, 12.24; 345/327, 376, 378, 345/2.1; 381/315, 327, 376, 378
See application file for complete search history.

(56) References Cited

U.S. PATENT DOCUMENTS 3,723,667 A * 3/1973 Park et al. .................. 369/47.55
4,706,117 A * 11/1987 Schoolman ..................... 348/53
(Continued)

FOREIGN PATENT DOCUMENTS

EP          1213896 A1 *  6/2002  .............. H04N 7/14
EP          1 048 117        11/2006
(Continued)

OTHER PUBLICATIONS

International Search Report issued May 15, 2007 in the International (PCT) Application of which the present application is the U.S. National Stage.

*Primary Examiner* — George Bugg
*Assistant Examiner* — Paul Obiniyi
(74) *Attorney, Agent, or Firm* — Wenderoth, Lind & Ponack, L.L.P.

(57) ABSTRACT

A wearable device is worn by a person participating in an event in which a plurality of other people are participating and wearing other wearable devices. The wearable device includes a request unit for transmitting a request signal to other wearable devices that are in a predetermined range, and receiving a response to the request signal from each of the other wearable devices, and a communication unit for determining, with use of the received responses, one or more of the other wearable devices to be a communication partner, and performing data communication with the determined one or more other wearable devices. The data received in the communication is data collected by the one or more other wearable devices determined to be communication partners, and the data is used as a profile component when creating a profile of the event.

17 Claims, 26 Drawing Sheets

(56) References Cited

U.S. PATENT DOCUMENTS

| | | | | |
|---|---|---|---|---|
| 4,867,442 A | * | 9/1989 | Matthews | 482/8 |
| 5,144,294 A | * | 9/1992 | Alonzi et al. | 340/8.1 |
| 5,572,401 A | * | 11/1996 | Carroll | 361/679.03 |
| 5,617,477 A | * | 4/1997 | Boyden | 381/309 |
| 5,680,465 A | * | 10/1997 | Boyden | 381/309 |
| 5,682,434 A | * | 10/1997 | Boyden | 381/385 |
| 5,687,245 A | * | 11/1997 | Boyden | 381/385 |
| 5,694,475 A | * | 12/1997 | Boyden | 381/327 |
| 5,737,436 A | * | 4/1998 | Boyden | 381/385 |
| 5,774,791 A | * | 6/1998 | Strohallen et al. | 455/41.1 |
| 5,815,579 A | * | 9/1998 | Boyden | 381/301 |
| 5,945,988 A | * | 8/1999 | Williams et al. | 715/747 |
| 5,953,434 A | * | 9/1999 | Boyden | 381/376 |
| 6,014,080 A | * | 1/2000 | Layson, Jr. | 340/573.1 |
| 6,091,832 A | * | 7/2000 | Shurman et al. | 381/381 |
| 6,097,927 A | * | 8/2000 | LaDue | 434/308 |
| 6,301,367 B1 | * | 10/2001 | Boyden et al. | 381/376 |
| 6,405,213 B1 | * | 6/2002 | Layson et al. | 707/758 |
| 6,694,034 B2 | * | 2/2004 | Julstrom et al. | 381/315 |
| 6,714,233 B2 | * | 3/2004 | Chihara et al. | 348/14.02 |
| 6,754,632 B1 | * | 6/2004 | Kalinowski et al. | 704/271 |
| 6,757,719 B1 | * | 6/2004 | Lightman et al. | 709/219 |
| 6,850,773 B1 | * | 2/2005 | Ghassabian | 455/550.1 |
| 7,061,396 B1 | * | 6/2006 | Conrad et al. | 340/8.1 |
| 7,230,582 B1 | * | 6/2007 | Dove et al. | 345/2.1 |
| 7,266,498 B1 | * | 9/2007 | Connelly | 704/270 |
| 7,605,714 B2 | * | 10/2009 | Thompson et al. | 340/539.11 |
| 7,664,558 B2 | * | 2/2010 | Lindahl et al. | 700/94 |
| 7,702,728 B2 | * | 4/2010 | Zaner et al. | 709/205 |
| 7,738,664 B2 | * | 6/2010 | Kawada et al. | 381/81 |
| 2001/0011025 A1 | * | 8/2001 | Ohki et al. | 455/556 |
| 2001/0011954 A1 | * | 8/2001 | Shelton et al. | 340/825.49 |
| 2001/0042014 A1 | * | 11/2001 | Lowry et al. | 705/14 |
| 2002/0019736 A1 | * | 2/2002 | Kimura et al. | 704/260 |
| 2002/0068600 A1 | * | 6/2002 | Chihara et al. | 455/550 |
| 2002/0094845 A1 | * | 7/2002 | Inasaka | 455/566 |
| 2002/0175990 A1 | * | 11/2002 | Martino et al. | 348/14.08 |
| 2003/0044033 A1 | * | 3/2003 | Julstrom et al. | 381/315 |
| 2004/0018476 A1 | * | 1/2004 | LaDue | 434/307 R |
| 2004/0086141 A1 | * | 5/2004 | Robinson | 381/301 |
| 2004/0128200 A1 | * | 7/2004 | Sacks et al. | 705/16 |
| 2004/0146172 A1 | * | 7/2004 | Goswami et al. | 381/378 |
| 2004/0192260 A1 | * | 9/2004 | Sugimoto et al. | 455/412.1 |
| 2004/0198391 A1 | * | 10/2004 | Sanders et al. | 455/456.1 |
| 2004/0204168 A1 | * | 10/2004 | Laurila | 455/569.1 |
| 2004/0212637 A1 | * | 10/2004 | Varghese | 345/723 |
| 2005/0131688 A1 | | 6/2005 | Goronzy et al. | |
| 2005/0132290 A1 | * | 6/2005 | Buchner et al. | 715/702 |
| 2005/0143140 A1 | * | 6/2005 | Sanders et al. | 455/569.1 |
| 2005/0282530 A1 | * | 12/2005 | Raff | 455/418 |
| 2006/0126861 A1 | * | 6/2006 | Saliterman | 381/77 |
| 2006/0183427 A1 | * | 8/2006 | Warren | 455/66.1 |
| 2006/0255963 A1 | * | 11/2006 | Thompson et al. | 340/825.69 |
| 2006/0291680 A1 | * | 12/2006 | Roeck | 381/315 |
| 2007/0210983 A1 | * | 9/2007 | Dove et al. | 345/2.1 |
| 2007/0241862 A1 | * | 10/2007 | Dimig et al. | 340/5.62 |
| 2008/0117060 A1 | * | 5/2008 | Cuddihy et al. | 340/573.1 |
| 2008/0216171 A1 | * | 9/2008 | Sano et al. | 726/19 |
| 2010/0135512 A1 | * | 6/2010 | Haenggi et al. | 381/315 |

FOREIGN PATENT DOCUMENTS

| | | | |
|---|---|---|---|
| JP | 2053636 | 6/1989 | |
| JP | 5-122689 | 5/1993 | |
| JP | 2737682 | 1/1998 | |
| JP | 2002-24113 | 1/2002 | |
| JP | 2002-123878 | 4/2002 | |
| JP | 2002160883 A * | 6/2002 | |
| JP | 2002-523855 | 7/2002 | |
| JP | 3492895 | 11/2003 | |
| JP | 2004-356970 | 12/2004 | |
| JP | 2005-173569 | 6/2005 | |
| JP | 2005227555 A * | 8/2005 | G10L 15/06 |
| WO | 00/11793 | 3/2000 | |
| WO | WO 2004110099 A2 * | 12/2004 | H04R 25/00 |

* cited by examiner

FIG. 8

INFORMATION RECEIVED FROM OTHER DEVICES

| DEVICE ID OF WEARABLE DEVICES | ORIENTATION INFORMATION | AUDIO |
|---|---|---|
| aaa | $d_2(\theta_2)$ | Audio2 |
| bbb | $d_3(\theta_3)$ | Audio3 |
| ccc | $d_4(\theta_4)$ | Audio4 |
| ddd | $d_5(\theta_5)$ | Audio5 |
| eee | $d_6(\theta_6)$ | Audio6 |
| fff | $d_7(\theta_7)$ | Audio7 |
| ggg | $d_8(\theta_8)$ | Audio8 |
| hhh | $d_9(\theta_9)$ | Audio9 |

FIG. 9

INFORMATION RECEIVED FROM LOCATION SERVER

| DEVICE ID OF WEARABLE DEVICES | LOCATION INFORMATION |
|---|---|
| ooo | $P_1(x_1, y_1, z_1)$ |
| aaa | $P_2(x_2, y_2, z_2)$ |
| bbb | $P_3(x_3, y_3, z_3)$ |
| ccc | $P_4(x_4, y_4, z_4)$ |
| ddd | $P_5(x_5, y_5, z_5)$ |
| eee | $P_6(x_6, y_6, z_6)$ |
| fff | $P_7(x_7, y_7, z_7)$ |
| ggg | $P_8(x_8, y_8, z_8)$ |
| hhh | $P_9(x_9, y_9, z_9)$ |

FIG. 12

| TIME | IDS OF DEVICES IN SAME CONVERSATION GROUP | AUDIO | IMAGE |
|---|---|---|---|
| T1~T2 | aaa | Audio1 | Video1 |
| | bbb | | |
| | ccc | | |
| | ddd | | |
| | eee | | |

FIG. 18

| TIME | UTTERANCE TIMING | ID OF DEVICE TARGETED FOR IMAGE ACQUISITION | ACQUIRED IMAGE |
|---|---|---|---|
| T1~T2 | t1~t2 | ooo | Video1 |
| | t3~t4 | ccc | Video2 |
| | t5~t6 | eee | Video3 |
| | t7~t8 | ooo | Video4 |
| | t9~t10 | eee | Video5 |
| | t11~t12 | ccc | Video6 |

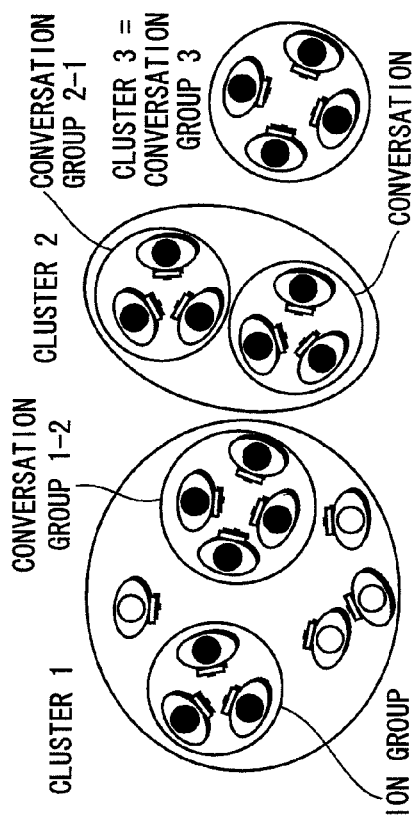
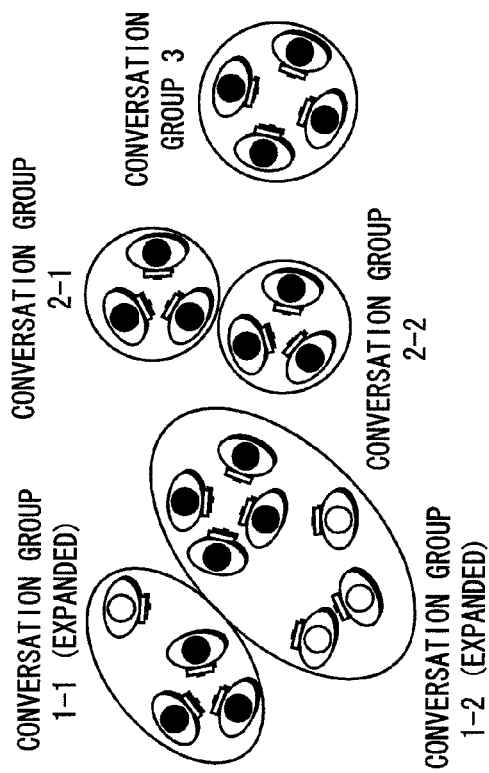
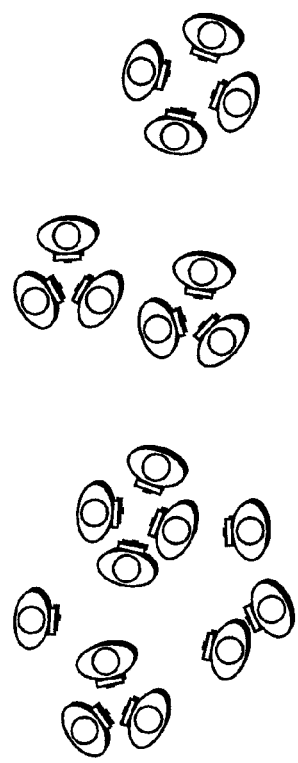
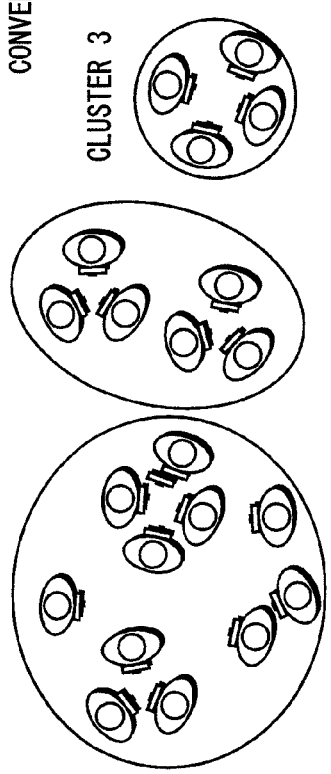

FIG. 30

| TIME | IDS OF DEVICES IN SAME CONVERSATION GROUP | LOCATION | ORIENTATION | AUDIO ACQUIRED FROM OTHER DEVICES | AUDIO ACQUIRED BY OWN DEVICE | IMAGE ACQUIRED BY OWN DEVICE |
|---|---|---|---|---|---|---|
| T₁~T₂ | aaa | | | | Audio1 | Video1 |
| | bbb | P₂ | d₂ | Audio b | | |
| | ccc | P₃ | d₃ | Audio c | | |
| | ddd | P₄ | d₄ | Audio d | | |
| | eee | P₅ | d₅ | Audio e | | |
| | | P₆ | d₆ | Audio f | | |

WEARABLE DEVICE

TECHNICAL FIELD

The present invention relates to a wearable device.

BACKGROUND ART

A wearable device is a device that is worn like clothes or a wristwatch or held like a bag or pen during use. In recent years, wearable devices have become lighter, and wearable devices that include a microphone and a camera are not uncommon. One example of a wearable device is a wearable camera that can perform automatic imaging and use audio as a trigger for releasing the shutter or starting video recording (see patent document 1).

Patent document 1: Japanese Patent Application Publication No. 2004-356970

A recent trend in product development has been to consider adding a profile creation function to wearable devices.

A profile creation function refers to a function for achieving the following. When a user who is wearing a wearable device participates in an event such as a party or group tour, data automatically collected by the wearable device is used as components to create a memoir or record of the event, as a so-called "profile" of the event. Since this wearable device includes a camera and a microphone, audio data and video data collected by the wearable device can be used as data material when creating a profile.

However, although scenes around a user can be imaged and used as profile components in this kind of profile creation function, including images of this user attending the event in the data material for the profile is difficult. This is because a wearable camera generally acquires image information in a direction facing away from the user. In other words, since the data material that can be used by a wearable device when creating a profile is limited to data collected by this particular wearable device, and since the data that can be acquired by the wearable device is limited, the profile created by the profile creation function has a narrow range of expression.

An aim of the present invention is to provide a wearable device that expands the range of expression when creating a profile, by using images etc. of the user who is wearing the wearable device at an event as data material.

SUMMARY OF THE INVENTION

In order to solve the above problem, one aspect of the present invention is a wearable device that is worn by a person participating in an event in which a plurality of other people are participating and wearing other wearable devices, the wearable device including: a request unit operable to transmit a request signal to other wearable devices that are in a predetermined range, and receive a response to the request signal from each of the other wearable devices; and a communication unit operable to determine, with use of the received responses, one or more of the other wearable devices to be a communication partner, and perform data communication with the determined one or more other wearable devices, wherein data received in the communication is data collected by the one or more other wearable devices determined to be communication partners, and the data is used as a profile component when creating a profile of the event.

EFFECTS OF THE INVENTION

According to this structure, when other participants in the event are wearing wearable devices that can transmit a response such as above, the wearable device of the present invention determines which of the other wearable devices are to be communication partners, and uses data received from the communication partners as profile components. Accordingly, if data material that cannot be acquired by the wearable device of the present invention can in fact be acquired by the wearable devices being worn by the other participants, the wearable device of the present invention can acquire and use such data material from the other wearable devices in profile creation. This structure enables expanding the range of expression when creating a profile.

Note that the concept of an event includes a conference, a lecture, a meal, a standing conversation, a group tour, a party, etc.

Here, for each of the other wearable devices, the communication unit may determine, with use of the response received therefrom, whether the other wearable device belongs to a same conversation group as the wearable device, and in a case of judging affirmatively, may determine the other wearable device to be the communication partner.

Here, each of the responses may include audio information acquired by the other wearable devices that received the request signal, the communication unit may include an overlap rate calculation subunit operable to calculate an overlap rate between (i) an utterance interval in own audio information acquired by the wearable device and (ii) an utterance interval in the audio information of each response received by the communication unit from the other wearable devices, and for each of the other wearable devices, the communication unit may determine the other wearable device to be in the same conversation group if the overlap rate pertaining thereto is less than or equal to a predetermined threshold.

This structure enables specifying the other wearable devices that are being worn by users who are talking to the user wearing the wearable device of the present invention, thereby making it possible to acquire more effective data to be used as profile components.

Note that the overlap rate calculation subunit recited in the claims corresponds to the same conversation group detection unit described in the embodiments.

Here, one or more of the utterance intervals may include an interjectory response, which is an utterance interval portion in which a vowel sound continues for a predetermined time period, and the overlap rate calculation subunit may exclude the one or more utterance intervals including the interjectory response when calculating the overlap rates.

According to this structure, utterance intervals that overlap due to the inclusion of an interjectory response are excluded when calculating overlap rates, thereby increasing precision when determining which of the other devices are being worn by users talking to the user wearing the wearable device of the present invention.

Here, each of the responses may further include location information, the wearable device may further include: a distance calculation unit operable to calculate a distance between the wearable device and each of the other wearable devices with use of own location information of the wearable device and the location information received from the other wearable devices by the communication unit, and for each of the other wearable devices, the communication unit may determine the other wearable device to be in the same conversation group if the distance pertaining thereto is less than or equal to a predetermined threshold.

This structure enables acquiring effective data to be used as profile components.

Note that the distance calculation subunit recited in the claims corresponds to the same conversation group detection unit described in the embodiments.

Here, each of the responses may further include orientation information, the wearable device may further include: an orientation change amount calculation unit operable to calculate an orientation change amount of the wearable device and each of the other wearable devices with use of own orientation information of the wearable device and the orientation information included in the responses received from the other wearable devices, and for each of the other wearable devices, the communication unit may determine the other wearable device to be in the same conversation group if a difference between the orientation change amount of the wearable device and the orientation change amount of the other wearable device targeted for determination is less than or equal to a predetermined threshold.

This structure enables acquiring effective data to be used as profile components.

Note that the orientation change amount calculation subunit recited in the claims corresponds to the same conversation group detection unit described in the embodiments.

Also, although data can be acquired by performing data communication with the determined other wearable devices, performing editing during profile creation is very troublesome for the user, and often requires substantial effort.

Here, the wearable device may create the profile, and the communication unit may be further operable to transmit the created profile to the other wearable devices.

This structure eliminates the need for the user of the wearable device to perform editing, and facilitates the creation of, for example, a profile of the user wearing the wearable device, or a profile including images of only the speakers. This structure also enables sharing a created profile with the one or more other wearable devices determined to be communication partners.

Here, the data collected by the one or more other wearable devices determined to be communication partners may include image data, and the profile may be created based on a combination of (i) from among the one or more other wearable devices determined to be communication partners, an other wearable device pertaining to a speaker and (ii) a wearable device that has captured an image of the speaker.

This structure enables creating a profile in which the speakers always appear.

Here, the profile may be created with use of audio collected by, from among the one or more other wearable devices determined to be communication partners, an other wearable device pertaining to a speaker.

According to this structure, even if the wearable device of the present invention could not collect clear audio due to, for example, the position in relation to the wearable device being worn by the speaker, a profile including clear audio can be created by using audio collected by the wearable device being worn by the speaker.

The above wearable device may further include: a recording unit operable to record data regarding the one or more other wearable devices determined to be communication partners.

This structure enables creating a profile when necessary, with use of data that has been recorded.

Here, the server apparatus may further include: a clustering unit operable to acquire location information indicating a location of each of the wearable devices, and divide the plurality of wearable devices into a predetermined number of clusters with use of the acquired location information, wherein for each cluster, the communication unit determines one or more of the wearable devices to be a communication partner.

According to this structure, the wearable devices are roughly divided into clusters based on the location information before the formation unit forms groups, thereby substantially reducing the number of operations required when forming conversation groups if many wearable devices exist.

BRIEF DESCRIPTION OF THE DRAWINGS

FIG. 8 shows data received from other wearable devices;

FIG. 9 shows data received from a location server 400;

FIG. 12 shows a device ID list;

FIG. 18 shows a relationship between timings of utterances made by speakers, device IDs of devices targeted for image acquisition, and acquired images;

FIG. 28(a) is an overhead map of locations of 21 individuals at a certain time, FIG. 28(b) shows a result of clustering performed by a clustering subunit 521, FIG. 28(c) illustrates a person's direction and activeness in others' conversation, FIG. 28(d) shows conversation groups that have been detected, and FIG. 28(e) shows the conversation groups that all of the participants have been divided into;

FIG. 30 shows a device ID list 2.

Figure 1:
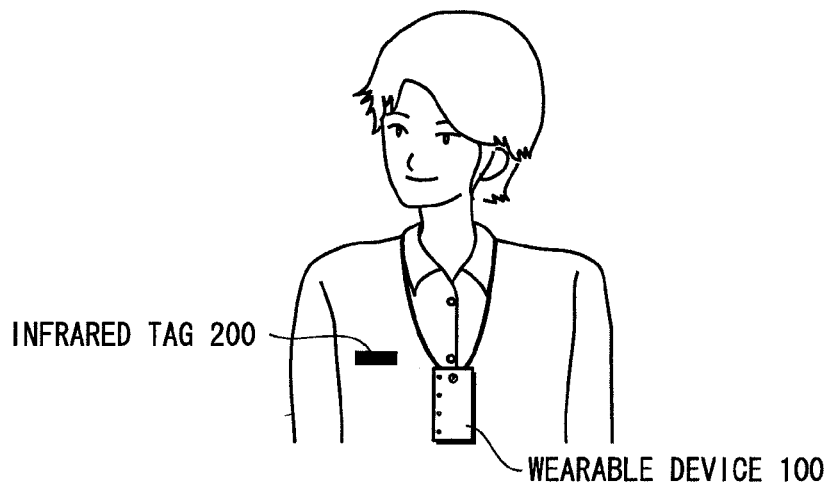
FIG. 1 shows a wearable device being worn by a user.

DESCRIPTION OF THE CHARACTERS 100-100h, 600-600f wearable device
101 CPU
102 ROM
103 RAM
104 microphone
105, 108 A/D converter
106, 109 encoder
107 camera
110 electronic compass
111 memory card
112 communication unit
121, 601 imaging unit
122, 602 sound collection unit
123 wearer-direction audio acquisition subunit
124 non-wearer-direction audio acquisition subunit
125, 603 orientation detection unit
126, 540 utterance timing extraction unit
127, 510, 604 communication unit
128, 520 same conversation group detection unit
129, 550 imaging subject detection unit
130, 560 imaging condition determination unit
131, 580 creation unit
132, 570, 605 recording unit
200 infrared tag
300 infrared wide-angle camera
400 location server
500 creation server
521 clustering subunit
522 intra-cluster conversation group detection subunit
523 utterance information generation subunit
524 compatibility rate calculation subunit

DETAILED DESCRIPTION OF THE INVENTION

Embodiment 1

Overview

Firstly, the following is an overview of a wearable device pertaining to the present invention.

Figure 2:
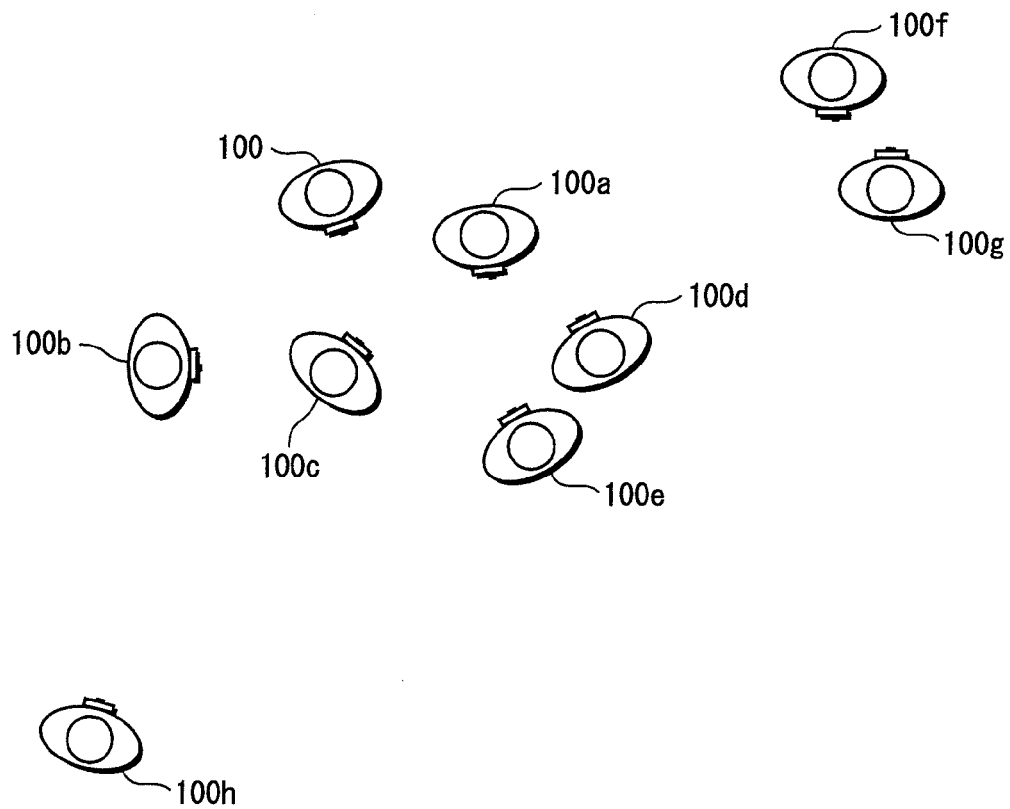
FIG. 2 shows a situation in which a plurality of people are in a proximity of the user wearing the wearable device.

In the present invention, a user wears a wearable device 100 as shown in FIG. 1, and plurality of other users wearing wearable devices are assumed to be in the proximity, as shown in FIG. 2. There are various examples of situations in which there would be a plurality of such users, such as conferences, lectures, meals, standing conversations, group tours, and parties. Let us now consider a case in which there is a group having a conversation (a conversation group) among the users in the proximity. Of course, there may be more than one such conversation group, and there may be users who are not participating in a conversation. Here, a conversation does not refer to a situation in which one user speaks for an extended period of time (e.g., one minute or longer), but instead refers to a situation in which the speaker changes to an appropriate degree.

Figure 3:
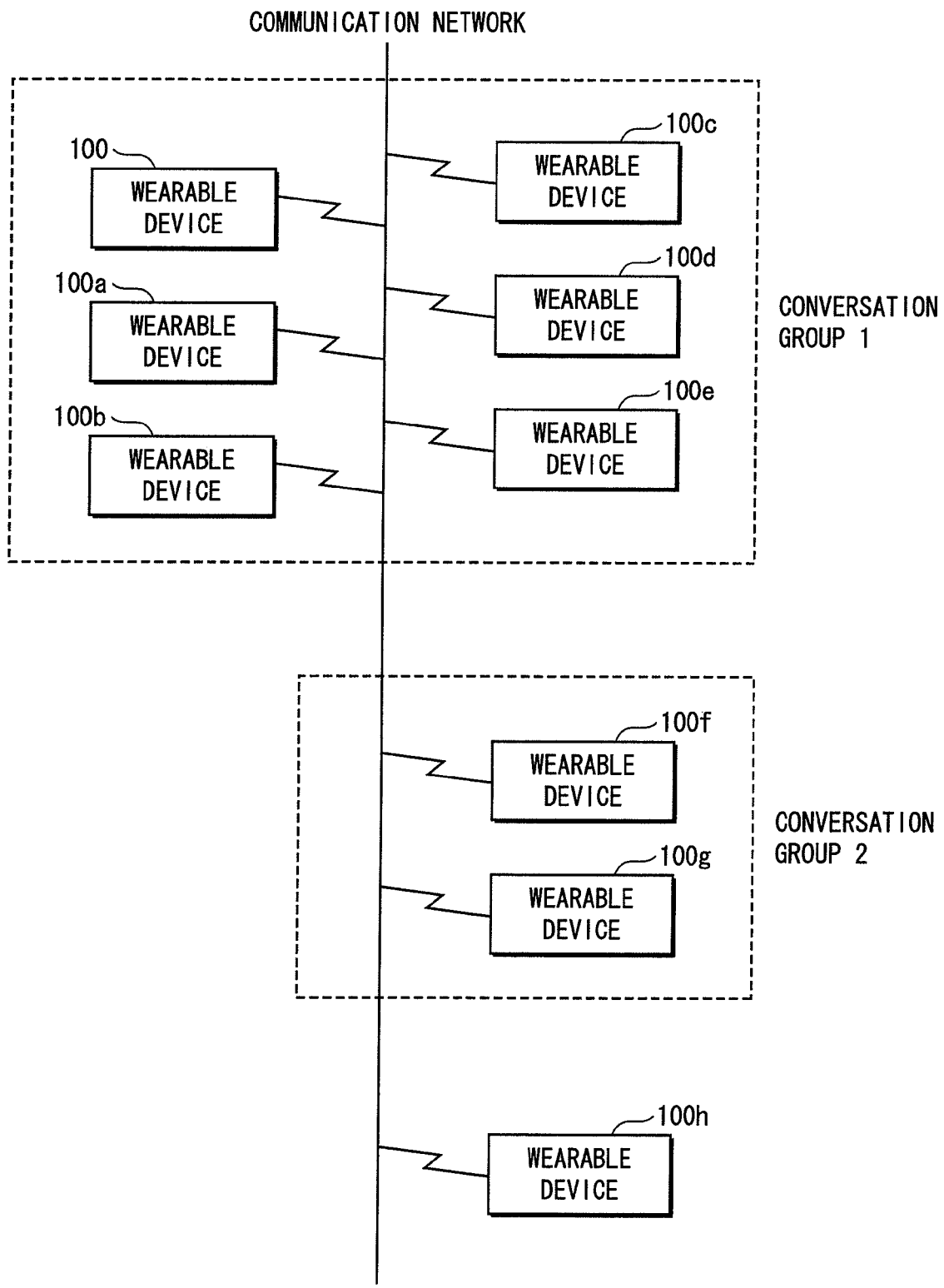
FIG. 3 shows a situation in which a plurality of wearable devices are communicating with each other.

Wearable devices 100, 100a, 100b, 100c, 100d, 100e, 100f, 100g, and 100h shown in FIG. 2 are connected to each other via a communication network, as shown in FIG. 3. Here, the communication network is a wireless LAN. FIG. 3 shows a situation in which the wearable devices are communicating with each other. FIG. 3 shows an exemplary situation in which the people wearing the wearable devices 100 to 100h are all within a communication range, a conversation group 1 is made up of the wearable devices 100 to 100e, a conversation group 2 is made up of the wearable devices 100f and 100g, and a person wearing the wearable device 100h is in the communication range but not included in either of the conversation groups.

Figure 4:
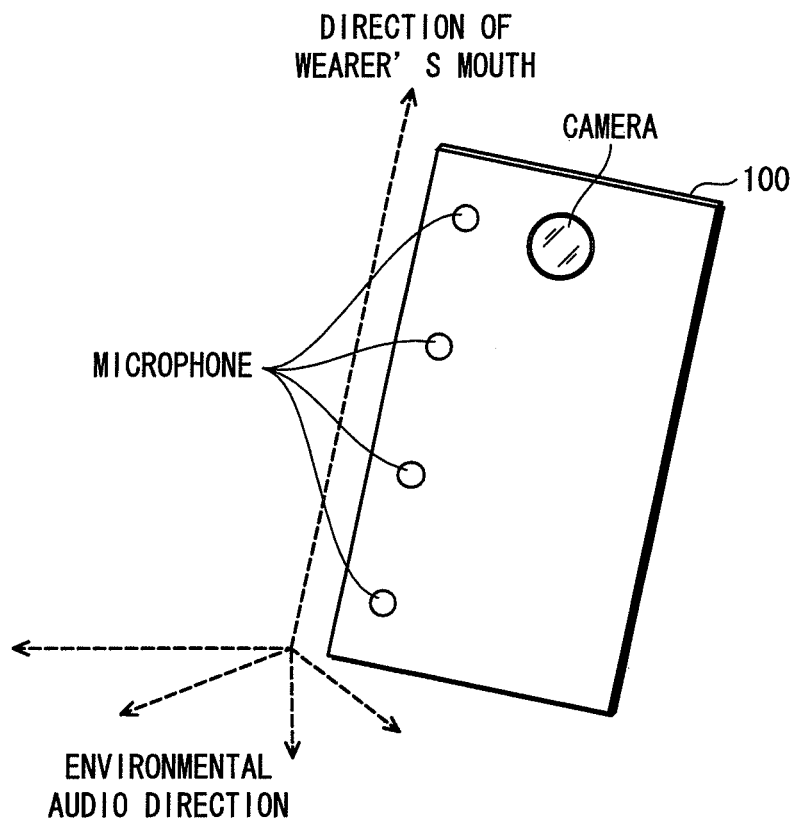
FIG. 4 is an external view of a wearable device.
Figure 5:
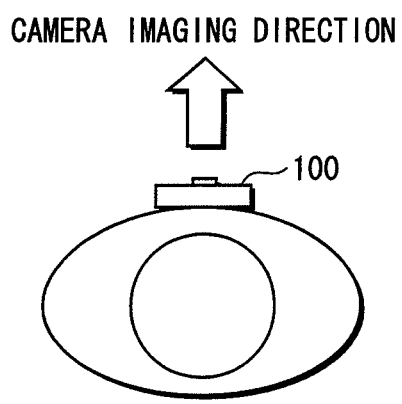
FIG. 5 shows an imaging direction of a wearable device.

As shown in FIG. 4, each of the wearable devices 100 to 100h includes a camera and a plurality of microphones, and records images and audio acquired by the camera and microphones to a recording medium. Although wearing a wearable device having such a structure enables a user to favorably collect audio, the user generally cannot capture images of himself/herself. As shown in FIG. 5, image information is acquired in a direction facing away from the user.

A feature of the wearable device 100 pertaining to the present invention is that, from among a plurality of wearable devices being worn by other people (the wearable devices 100a to 100h), the (primary) wearable device 100 determines one or more (secondary) wearable devices to be communication partners, that is to say, wearable devices being worn by users who belong to the same conversation group as the user wearing the wearable device 100 (in the example of FIG. 3, the wearable devices 100a to 100e), and performs data communication with the determined wearable devices without performing registration or authentication. Also, when creating a profile, the wearable device 100 uses images and audio captured by the determined (secondary) wearable devices as components for the profile.

Accordingly, although the wearable device 100 cannot itself capture images of the wearer, the wearable device 100 can acquire images of the wearer, images of other speakers in the conversation group, etc.

This completes the overview of the wearable device 100.

The following describes a method for detecting the locations of the wearable devices.

Location Detection Method

Various methods of detecting the locations of wearable devices have been proposed. The present embodiment employs a location detection method that uses an infrared wide-angle camera and an infrared tag. Specifically, in this method, a user wearing a wearable device also wears an infrared tag, an infrared wide-angle camera captures an image and detects the infrared tag as a bright spot in the image, coordinates of the bright spot detected in the image are converted to real-space coordinates, which are then used to determine the three-dimensional location of the infrared tag. The three-dimensional location of the infrared tag is considered to be the location of the wearable device.

Figure 6:
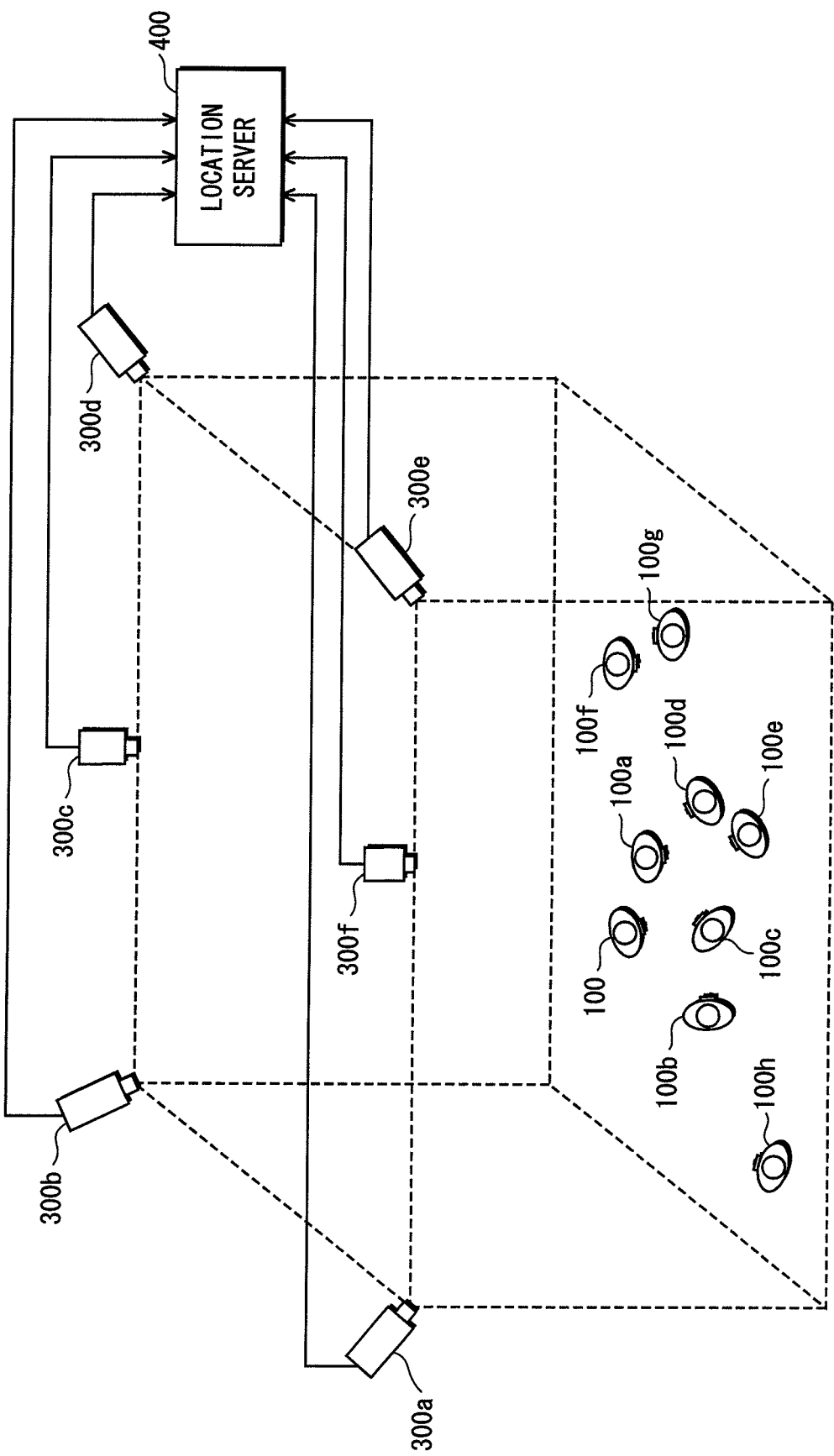
FIG. 6 shows a location detection system that uses infrared wide-angle cameras and infrared tags.

FIG. 6 shows a location detection system that uses infrared wide-angle cameras and infrared tags. This location detection system includes the wearable devices 100 to 100h being worn by users, infrared tags 200 to 200h also being worn by the users but not depicted in FIG. 6, six infrared wide-angle cameras 300a to 300f, and a location server 400.

The infrared tags 200 to 200h are infrared markers which each include an LED that emits infrared light and a device for controlling the blinking of the LED. In the example shown in FIG. 1, the infrared tag 200 is shaped like a name tag and is worn on the user's chest.

The infrared wide-angle cameras 300a to 300f each include a camera for acquiring video, a filter for blocking visible light and transmitting the infrared region of light, and a wide-angle lens.

The location server 400 processing images captured by the infrared wide-angle cameras 300a to 300f, calculates the locations of the infrared tags 200 to 200h (the wearable devices 100 to 100h) to generate location information, and manages the generated location information. More specifically, the location server 400 converts the locations of the bright spots on the captured infrared images into real-space coordinates based on the installation locations of the infrared wide-angle cameras 300a to 300f, and stores and manages the real-space coordinates in a storage apparatus. Here, the real-space coordinates that were converted from the locations of the bright spots (i.e., the locations of the infrared tags 200 to 200h) are considered to be the locations of the wearable devices 100 to 100h.

As described above, the wearable device 100 has a wireless LAN communication function, and can acquire the location information of the wearable devices 100 to 100h by receiving such information from the location server 400. Note that the location server 400 may transmit each piece of location information to only the corresponding one of the wearable devices 100 to 100h, and the wearable device 100 may acquire the other pieces of location information directly from the wearable devices 100a to 100f.

Below is a detailed description of the wearable device 100 pertaining to the present invention with reference to the drawings.

Communication Sequence

The following describes a communication sequence when the wearable device 100 performs same conversation group detection processing and profile creation processing. First, when detecting other wearable devices belonging to the same conversation group, the wearable device 100 transmits a polling signal to the wearable devices 100a to 100h in the communication range and to the location server 400, and receives a response from each. FIG. 8 shows data received from the other wearable devices. As shown in FIG. 8, the received data is composed of device IDs of the other wearable devices, orientation information, and audio information. FIG. 9 shows data received from the location server 400. As shown in FIG. 9, the received data is composed of device IDs of the other wearable devices and location information. Upon receiving the responses, the (primary) wearable device 100 performs same conversation group detection processing to detect other (secondary) wearable devices that are in the same conversation group as the (primary) wearable device 100. The wearable device then establishes a connection with each of the other wearable devices in the same conversation group in turn, and acquires images, audio, etc. that has been captured by the other wearable devices. The wearable device 100 then performs profile creation processing using the acquired images, audio, etc. in order to create a profile, and transmits the created profile to the other wearable devices in the same conversation group. The wearable device performs the above processing each time a predetermined time period has elapsed, thereby detecting the dynamically changing conversation group and creating a profile using audio and images acquired from the other wearable devices detected to be in the same conversation group.

Structure

Figure 10:
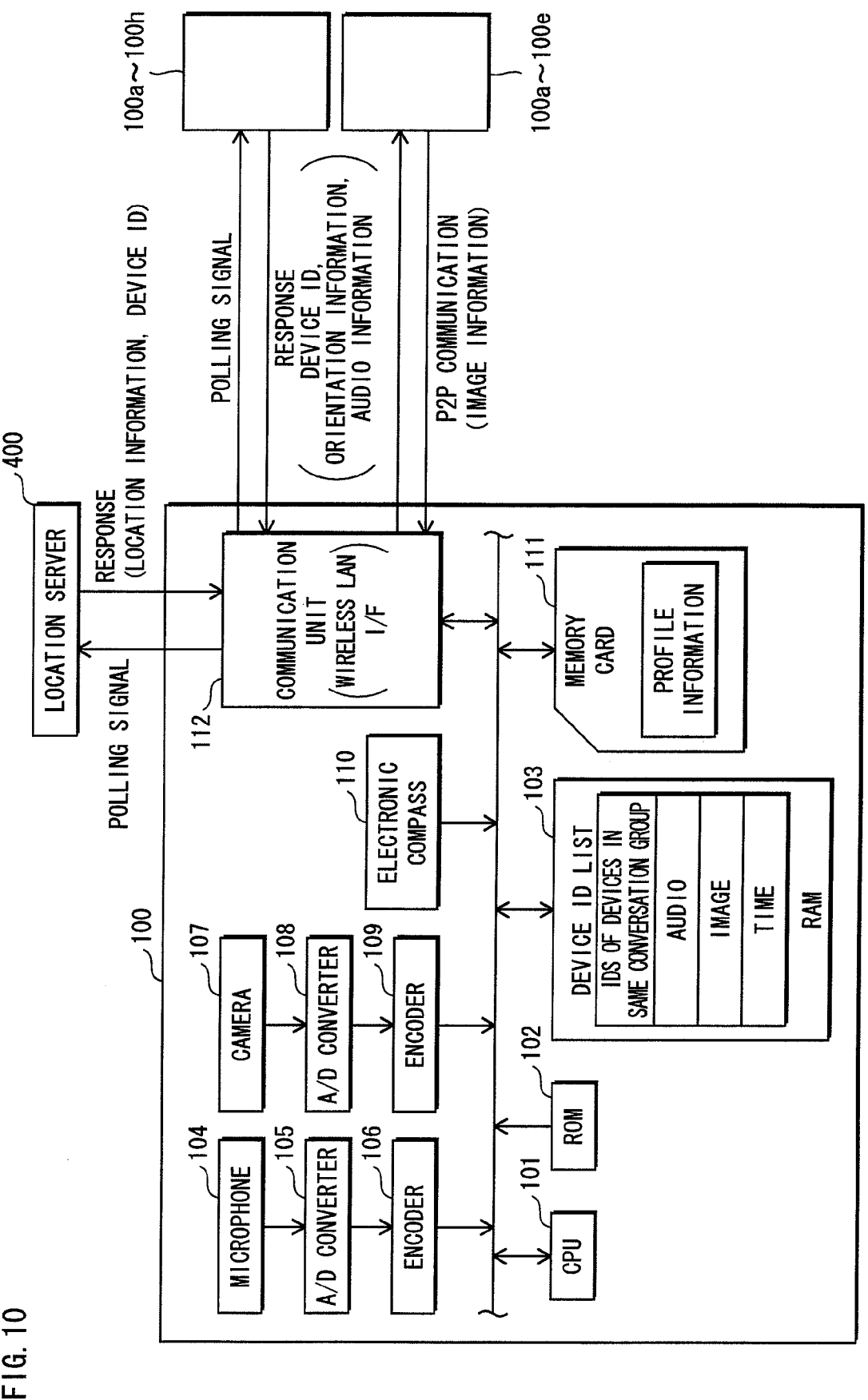
FIG. 10 shows a hardware structure of a wearable device 100.

The following describes the hardware structure of the wearable device 100. FIG. 10 shows the hardware structure of the wearable device 100. The wearable device 100 includes a CPU 101, a ROM 102, a RAM 103, a microphone 104, a camera 107, an A/D converter 105, an A/D converter 108, an encoder 106, an encoder 109, an electronic compass 110, a memory card 111, and a communication unit (wireless LAN interface) 112.

The CPU 101, ROM 102, and RAM 103 constitute a computer system and achieve their functions as a program stored in the ROM 102 is read by the CPU 101 and works in coordination with hardware resources.

The electronic compass 110 determines an orientation with use of the earth's magnetism, and detects which direction the device is facing.

The memory card 111 is a portable medium for recording profile information etc.

The communication unit 112 transmits a polling signal to the other wearable devices and the location server 400, and receives a response from the other wearable devices (device IDs, orientation information, and audio information) and a response from the location server 400 (device IDs and location information of the wearable devices 100 to 100h). After the other wearable devices that belong to the same conversation group have been detected, the communication unit 112 performs P2P communication with these other wearable devices in order to acquire images and audio to be used as profile components. Also, after a profile has been created, the communication unit 112 performs P2P communication with the other devices that belong to the same conversation group in order to transmit the created profile.

Figure 11:
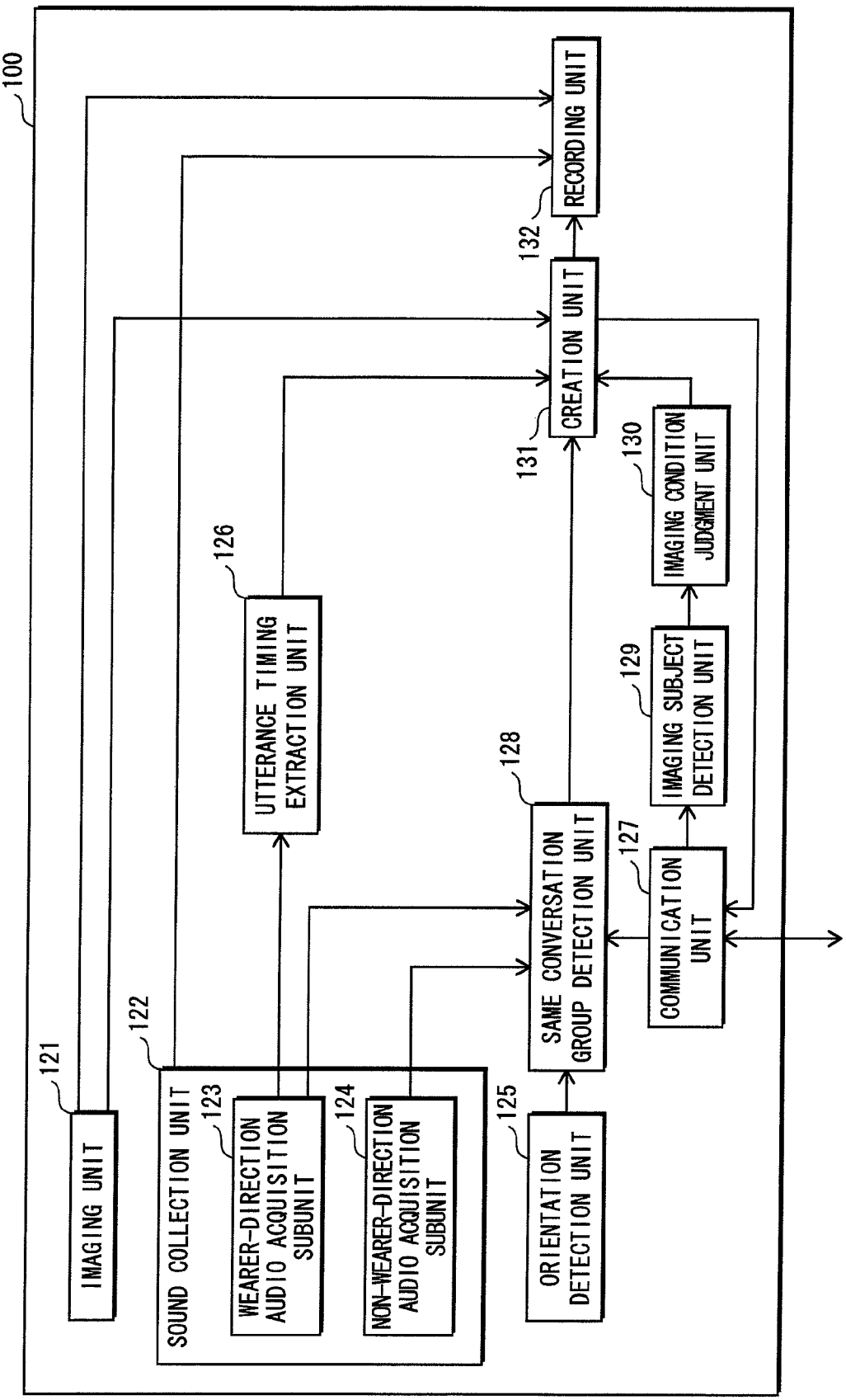
FIG. 11 shows a functional block structure of the wearable device 100.

The following describes the internal structure of the wearable device 100. FIG. 11 shows a functional block structure of the wearable device 100. The wearable device 100 includes an imaging unit 121, an audio collection unit 122, an orientation detection unit 125, an utterance timing extraction unit 126, a communication unit 127, a same conversation group detection unit 128, an imaging subject detection unit 129, an imaging condition judgment unit 130, a creation unit 131, and a recording unit 132.

The imaging unit 121 includes a CCD and a CMOS. The imaging unit 121 converts light from an external source into electrical signals, and outputs the electrical signals to the creation unit 131.

As shown in FIG. 4, the audio collection unit 122 includes four microphones. The audio collection unit 122 performs analog-to-digital conversion on audio signals acquired from the microphones, and outputs the resulting audio signals to the utterance timing extraction unit 126 and the same conversation group detection unit 128. More specifically, the audio collection unit 122 includes a wearer-direction audio acquisition subunit 123 and a non-wearer-direction audio acquisition subunit 124.

The wearer-direction audio acquisition subunit 123 performs directivity control so that audio arriving from the direction of the mouth of the wearable device 100 wearer is collected at a high S/N ratio. Taking the example of the microphone arrangement in FIG. 4, directivity control is realized by using a subtraction-type array microphone directivity control method that performs subtraction on audio signals acquired by the microphones.

The non-wearer-direction audio acquisition subunit 124 performs directivity control so that audio arriving from directions other than the direction of the mouth of the wearable device 100 wearer is collected at a high S/N ratio. Taking the example of the microphone arrangement in FIG. 4, directivity control is realized by using an addition-type array microphone directivity control method that performs addition on audio signals acquired by the microphones.

The orientation detection unit 125 includes the electronic compass 110 etc. The orientation detection unit 125 detects the orientation of the wearable device 100, and outputs the detected orientation to the same conversation group detection unit 128.

The utterance timing extraction unit 126 receives an audio signal from the wearer-direction audio acquisition subunit 123, detects an utterance in the received audio signal, and extracts an utterance timing pertaining to the detected utterance. Specifically, the utterance timing extraction unit 126 obtains start times and end times of utterance intervals collected by the wearer-direction audio acquisition subunit 123 from the user wearing the wearable device 100. Methods of extracting utterance timings include extraction methods using audio power or a cepstrum, an utterance interval extraction method using a statistical technique, and the like. Any method that satisfies an extraction precision requirement and cost requirement may be used.

The communication unit 127 includes an antenna via which the communication unit 127 receives data from the other wearable devices 100a to 100h and location server 400, and transmits a profile created by the creation unit 131, etc. to the other wearable devices 100a to 100h. Also, the communication unit 127 transmits received images to the imaging subject detection unit 129, and transmits received location information, orientation information, and audio information to the same conversation group detection unit 128. Here, an IEEE 802.11g wireless LAN is used as the communication system. The strength of waves can be configured freely in the wireless LAN, which enables determining the communication range.

The same conversation group detection unit 128 requests, via the communication unit 127, the other devices to transmit their orientation information and audio information, and the location server 400 to transmit the location information pertaining to the wearable devices 100 to 100h. The same conversation group detection unit 128 acquires, from the communication unit 127, the orientation information and audio information of the wearable devices 100a to 100h and the location information pertaining to the wearable devices 100 to 100h. The same conversation group detection unit 128 also acquires own orientation information from the orientation detection unit 125, and acquires own audio information from the audio collection unit 122. The same conversation group detection unit 128 detects other devices that belong to the same conversation group with use of the acquired location information, orientation information, and audio information. Specifics of the same conversation group detection processing flow are described later.

The imaging subject detection unit 129 receives, via the communication unit 127, images that have been transmitted to the device 100, detects an imaging subject in the images, and outputs a result of the detection to the imaging condition judgment unit 130.

The imaging condition judgment unit 130 receives the result of the imaging subject detection from the imaging subject detection unit 129, and judges the favorability of the imaging conditions of the imaging subject. Specifically, the imaging condition judgment unit 130 refers to the location information, orientation information, etc. of the wearable device being worn by a speaker, as well as location information, orientation information, etc. of other devices, and with use of such information, obtains images from the other devices in which the imaging subject is perceived to be the speaker, and judges which of the images has the best imaging conditions. Examples of best imaging conditions include the targeted speaker being prominent and clear in the image, the subject being front-lit and distinctly recognizable, and the subject being precisely framed without any obstructions. Specifics of the imaging condition judgment processing flow are described later.

The creation unit 131 creates a profile relating to users in the same conversation group, with use of audio and video acquired from the other wearable devices detected to be in the same conversation group. For example, the creation unit 131 selects, from among the video acquired from the other devices in the same conversation group, images in which the speaker in the same conversation group appears, and with use of the results of the judgment performed by the imaging condition judgment unit 130, furthermore selects which of the images has the best imaging conditions. The creation unit 131 creates a video of the speaker by combining the ultimately selected images with corresponding audio collected by the wearable device 100.

Also, the creation unit 131 selects, from among the images acquired from the other devices in the same conversation group, images in which the user of the wearable device 100 appears, and with use of the results of the judgment by the imaging condition judgment unit 130, furthermore selects the images that have the best imaging conditions. The creation unit 131 creates a video of the user of the wearable device 100 by combining the ultimately selected images with corresponding audio collected by the wearable device 100.

The recording unit 132 includes the memory card 111, the RAM 103, etc. The recording unit 132 records created profiles to the memory card 111 and records audio and images acquired by the wearable device 100 in the RAM 103 in correspondence with a result of the same conversation group detection unit 128. FIG. 12 shows a device ID list. The device ID list is a list of device IDs pertaining to other devices constituting the same conversation group as the device 100 in correspondence with audio, video, and times. Note that device IDs aaa, bbb, ccc, ddd, and eee indicate the other devices constituting the same conversation group as the device 100. The device IDs aaa, bbb, ccc, ddd, and eee indicate the device IDs of the wearable devices 100a, 100b, 100c, 100d, and 100e respectively.

This structure enables specifying the other wearable devices in the same conversation group with use of audio signals and image signals, or specifying the other devices in the same conversation group and audio and images therefrom with use of time information. This structure enables the user to, at a later date, search for a person he/she had a conversation with, or remember a person's name based on an image.

The following describes processing performed by same conversation group detection unit 128.

Same Conversation Group Detection Processing

Figure 13:
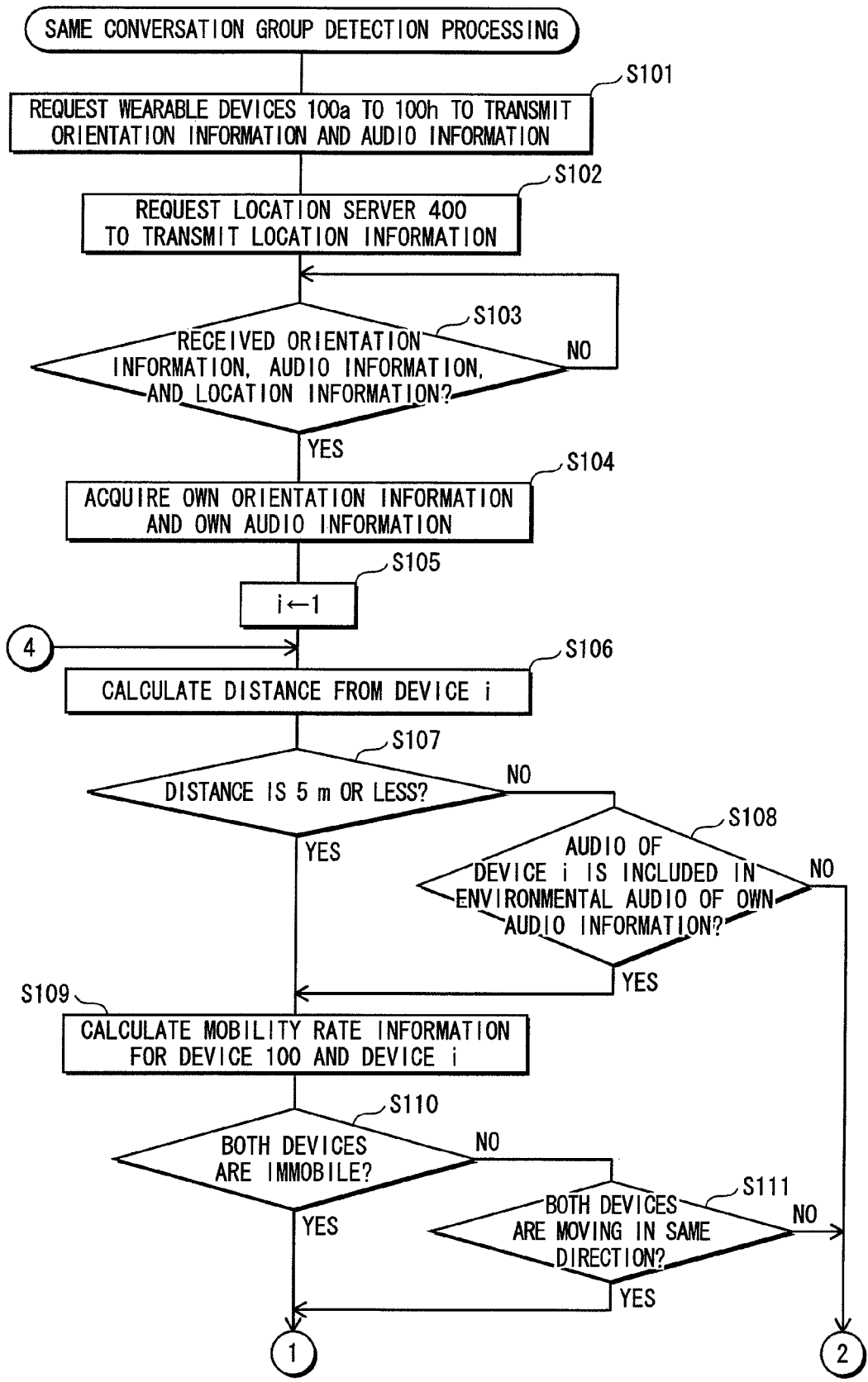
FIG. 13 is a flowchart showing same conversation group detection processing.
Figure 14:
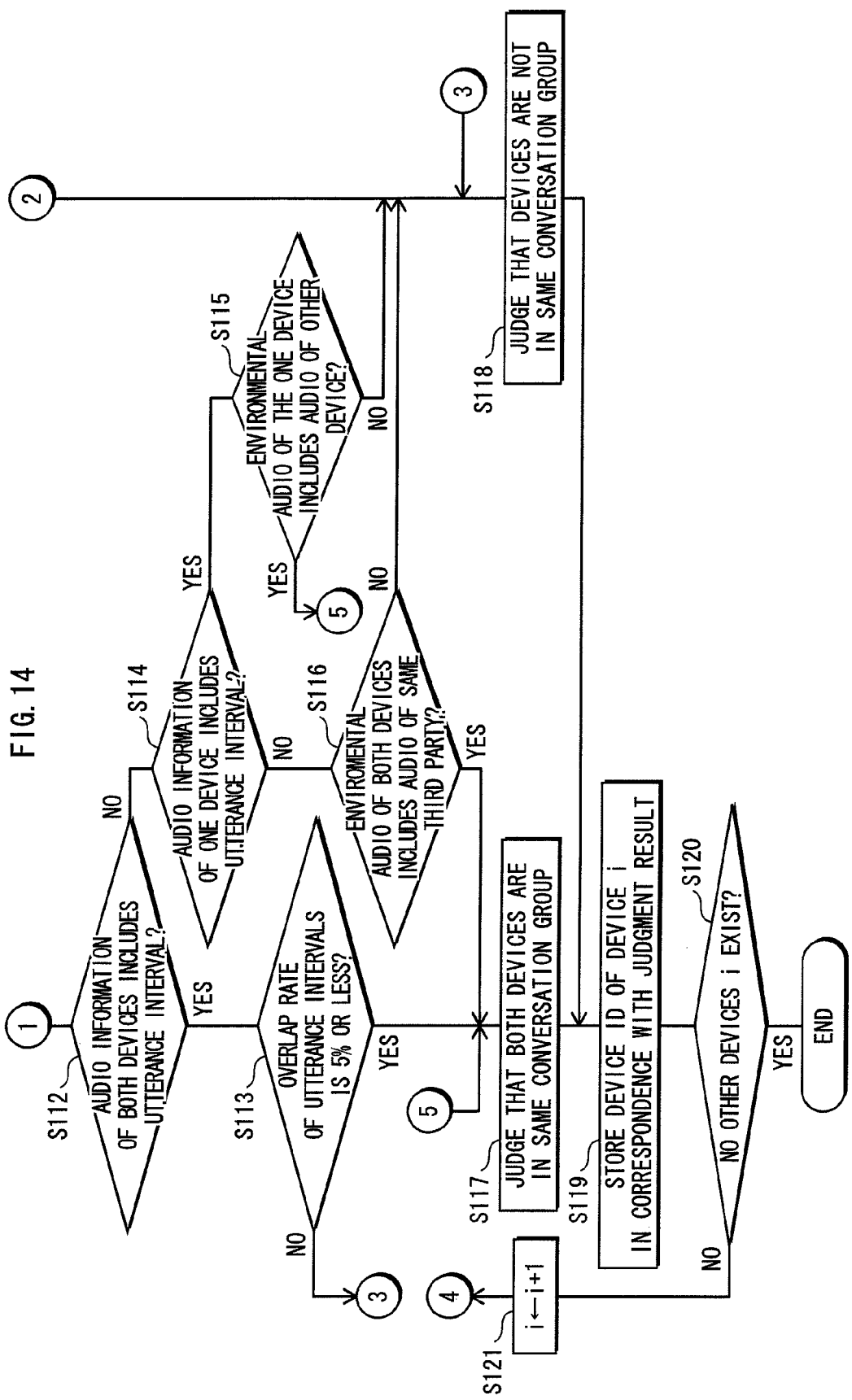
FIG. 14 is a flowchart showing a continuation of the same conversation group detection processing.

FIGS. 13 and 14 are flowcharts showing same conversation group detection processing. The wearable device 100 performs the processing shown in FIGS. 13 and 14 each time a predetermined time period has elapsed, thereby dynamically detecting other wearable devices that belong to the same conversation group. Here, this processing is performed each time a time period of three minutes has elapsed. In the flowcharts of FIGS. 13 and 14, the variable i specifies a wearable device. Firstly, the same conversation group detection unit 128 requests first orientation information and first audio information to be transmitted from the other wearable devices (step S101). Next, the same conversation group detection unit 128 requests location information pertaining to the other devices and the device 100 to be transmitted from the location server 400 (step S102). The communication unit 127 receives responses transmitted by the other devices and location server 400 in response to the request. The same conversation group detection unit 128 judges whether responses (orientation information, audio information, and location information) have been received by the communication unit 127 (step S103). If responses have been received (step S103:YES), the same conversation group detection unit 128 then acquires the own (second) orientation information and own (second) audio information from the orientation detection unit 125 and the audio collection unit 122 respectively (step S104). After acquiring the own orientation information and own audio information, the same conversation group detection unit 128 initializes i (step S104), and performs the following processing for each of the other devices (steps S106 to S119).

Firstly, the same conversation group detection unit 128 calculates a distance between the device 100 and the other device i with use of the acquired location information (step S106). For example, if the other device is device 100a, the location information pertaining to the device 100 and the other device 100a is P1(x1, y1, z1) and P2(x2, y2, z2) respectively, as shown in FIG. 9. The distance between these two points is obtained using the following expression.

$$r12 = \sqrt{(x1-x2)^2 + (y1-y2)^2} \quad \text{Expression 1}$$

Note that since the z direction does not particularly need to be taken into consideration, the values of z1 and z2 are considered to be the same. The same conversation group detection unit 128 then judges whether the distance between the two points is in a predetermined range. Here, the predetermined range is 5 m, and the same conversation group detection unit 128 judges whether the distance between the two points is less than or equal to 5 m (step S107).

If the distance between the two points is greater than 5 m, the same conversation group detection unit 128 judges whether audio from the other device is included in the environmental audio of the device 100 (step S108). Specifically, the same conversation group detection unit 128 compares audio acquired by the wearer-direction audio acquisition subunit of the other device and audio acquired by the non-wearer-direction audio acquisition subunit 124 of the device 100, and judges whether the start and end times of the audio match each other. If the start and end times of the audio match each other, the same conversation group detection unit 128 judges that audio from the other device is included as environmental audio in the audio collected by the device 100. This processing takes into consideration a case in which the user of the other device is using a loudspeaker etc. In other words, even if the two points are more than 5 m away from each other, the wearer of the device 100 may be able to hear the user of the other device. In this exceptional case, the other device is judged to possibly be in the same conversation group, and processing would continue.

If the distance between the two points is less than or equal to 5 m (step S107:YES), or audio from the other device is judged to be included in the environmental audio of the device 100 (step S108:YES), the same conversation group detection unit 128 generates mobility rate information for the device 100 and the other device (step S109). The mobility rate information is generated based on a distance moved and amount of change in orientation per predetermined time period (here, three minutes). After generating the mobility rate information, the same conversation group detection unit 128 judges whether the device 100 and the other device are both immobile (step S110). This is because if both the device 100 and the other device are immobile, there is a high possibility of belonging to the same conversation group. Specifically, the same conversation group detection unit 128 judges whether the distance moved and amount of change in orientation are 0.

If both of the devices are judged to be moving (step S110: NO), the same conversation group detection unit 128 judges whether the devices are moving in the same direction. Even if both of the devices are moving, there is a high possibility of them belonging to the same conversation group if they are moving in the same direction. Specifically, the same conversation group detection unit 128 judges whether the location information and amount of change in orientation are the same between the two devices. If such information is the same, the same conversation group detection unit 128 judges that the two devices are moving in the same direction.

If both of the devices are judged to be immobile (step S110:YES), or if both of the devices have been judged to be moving in the same direction (step S111:YES), the same conversation group detection unit 128 judges whether audio from both of the devices includes utterance intervals (step S112).

Upon judging negatively in step S112, the same conversation group detection unit 128 judges whether the audio of one of the devices includes utterance intervals (step S114). If the audio of one of the devices includes utterance intervals (step S114:YES), the same conversation group detection unit 128 judges whether audio from the other device is included in the environmental audio of the device whose audio includes utterance intervals (step S115).

If utterance intervals are not included in the audio of either device (step S114:NO), the same conversation group detection unit 128 judges whether the audio of a same third party is included in the environmental audio of both of the devices (step S116). Specifically, the same conversation group detection unit 128 compares audio acquired by the non-wearer-direction audio acquisition subunit 124 of the device 100 and audio acquired by the non-wearer-direction audio acquisition subunit of the other device, and judges whether start times and end times of the audio match between the two devices. Even though utterance intervals are not included in the audio of either device, if the audio of the same third party is included in the audio of both the device 100 and the other device, there is a possibility that the users of both devices are listening to the same speaker, and therefore both devices are detected to be in the same conversation group.

If utterance intervals are included in the audio of both devices (step S112:YES), the same conversation group detection unit 128 judges whether an overlap rate of the utterance intervals is less than or equal to 5% (step S113). If the overlap rate is judged to be less than or equal to 5% (step S113:YES), if the audio of one of the devices is judged to be included in the environmental audio of the other device (step S115:YES), or if the audio of a third party is judged to be included in the environmental audio of both devices (step S116:YES), the same conversation group detection unit 128 judges that the device 100 and the other device belong to the same conversation group (step S117) (i.e., determines that the other device is a group-participant wearable device).

In a case of judging negatively in any of steps S108, S111, S113, S115, and S116, the same conversation group detection unit 128 judges that the device 100 and the other device do not belong to the same conversation group (step S118)

The same conversation group detection unit 128 stores the device ID of the other device and a result of the judgment in correspondence with each other (step S119), and judges whether another device i exists (step S120). If another device i exists, the same conversation group detection unit 128 increments i by 1 (step S121) and returns to step S106. If another device i does not exist, same conversation group detection processing ends.

Creation Processing

Figure 15:
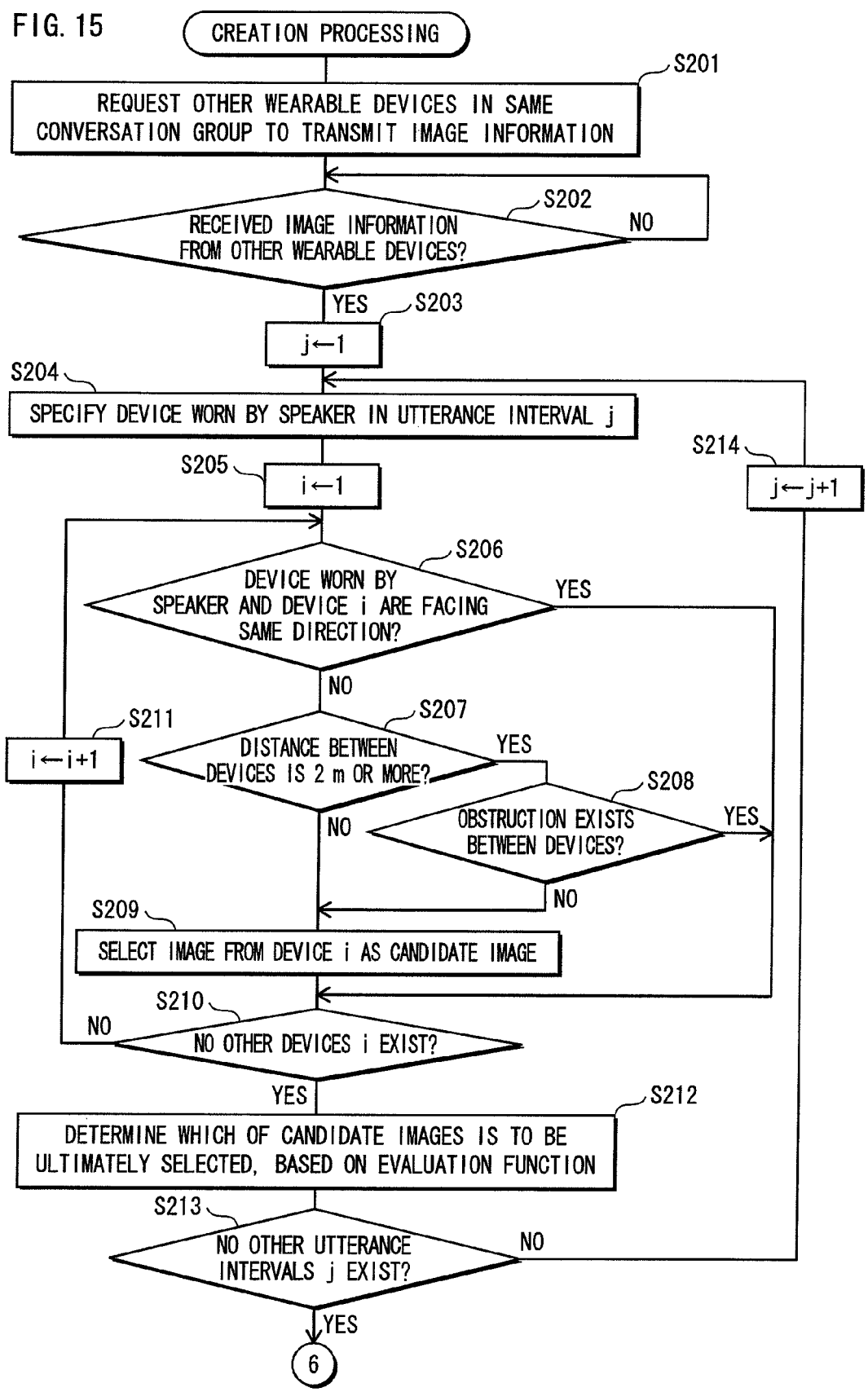
FIG. 15 is a flowchart showing creation processing.
Figure 16:
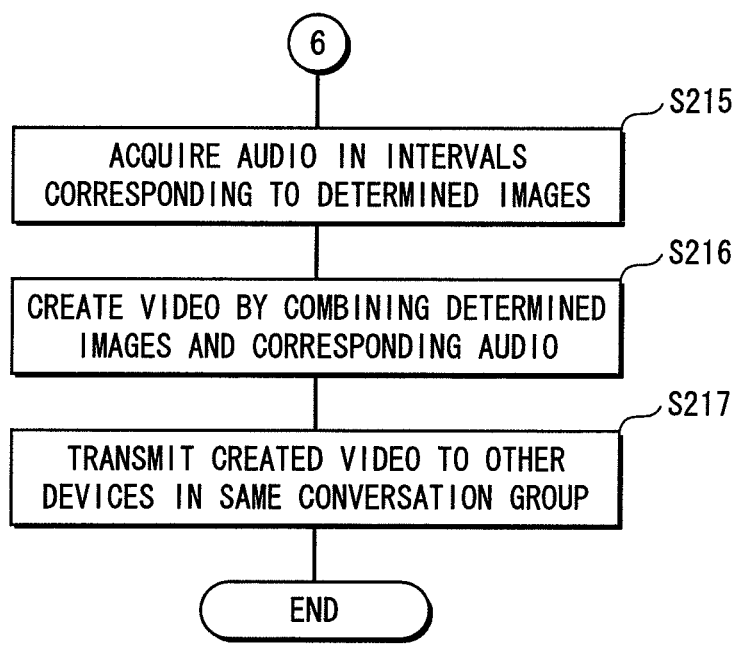
FIG. 16 is a flowchart showing a continuation of the creation processing.

FIGS. 15 and 16 are flowcharts showing creation processing. The following describes processing for joining images in which speakers in the same conversation group appear to create a single stream. In the flowcharts of FIGS. 15 and 16, the variable i specifies a wearable device that is in the same conversation group, but is not the device pertaining to the speaker, and the variable j specifies an utterance interval.

Firstly, other wearable devices judged to be in the same conversation group are requested to transmit image information (step S201). Upon receiving image information from the other wearable devices (step S202:YES), j is initialized (step S203). After j has been initialized, the device pertaining to the speaker in the utterance interval j is specified (step S204), and i is initialized (step S205). Whether the device pertaining to the speaker and the device i are facing the same direction is judged (step S206). Specifically, this judgment is performed with use of orientation information of the device pertaining to the speaker and the device i. If these devices are facing different directions, there is a high possibility of facing each other, and it is possible that a favorable image of the speaker can be acquired.

If the devices are facing different directions (step S206: NO), whether a distance between the devices is greater than or equal to 2 m is judged (step S207). If the distance between the devices is less than 2 m (step S207:NO), there is a very high possibility that a favorable image without any obstructions can be acquired, and therefore an image from the device i is selected as a candidate image for profile creation (step S209). If the distance between the devices is greater than or equal to 2 m (step S207:YES), whether an obstruction exists between the devices is judged (step S208). Specifically, whether or not an obstruction exists is judged by judging, with use of location information, whether the device of a third party exists between the device pertaining to the speaker and the device i in the same conversation group, as well as by analyzing an image acquired from the device and judging whether a face can be detected in the image. If a face can be detected, an obstruction is judged to not exist. If an obstruction is judged to not exist (step S208:NO), the image from the device i is selected as a candidate image for profile creation (step S209).

If the device pertaining to the speaker and the device are judged to be facing in the same direction (step S206), or an image from the device i has been selected as a candidate image, whether another device i exists is judged (step S210). If another device i exists, i is incremented by 1 (step S211), and processing returns to step S206). If another device i does not exist, which image from among the images selected as candidates is to be used is judged with use of an evaluation function. Here, the evaluation function is F=f(d, r, snr). In this evaluation function, d is an angle of the speaker's face, r is a distance between the two devices, and snr is a sharpness of the image. Here, d is calculated with use of orientation information of the device pertaining to the speaker and the device i, and the evaluation increases as d approaches a front view. Also, r is calculated with use of location information of the device pertaining to the speaker and the device i, and the evaluation increases as the distance between the device decreases. Also, snr is calculated with use of contrast, S/N ratio, and the like, and the evaluation increases as the sharpness increases.

Next, whether another utterance interval j exists is judged (step S213), and if another utterance interval j exists, j is incremented by 1 (step S214), and processing returns to step S204. If another utterance interval j does not exist, audio in an interval corresponding to images is acquired (step S215), and video is created by combining the audio and images (step S216). The created video is transmitted to other devices in the same conversation group (step S217). The other devices receive and record the video. This structure enables created video to be shared among devices in the same conversation group.

Concrete Example

Figure 17:
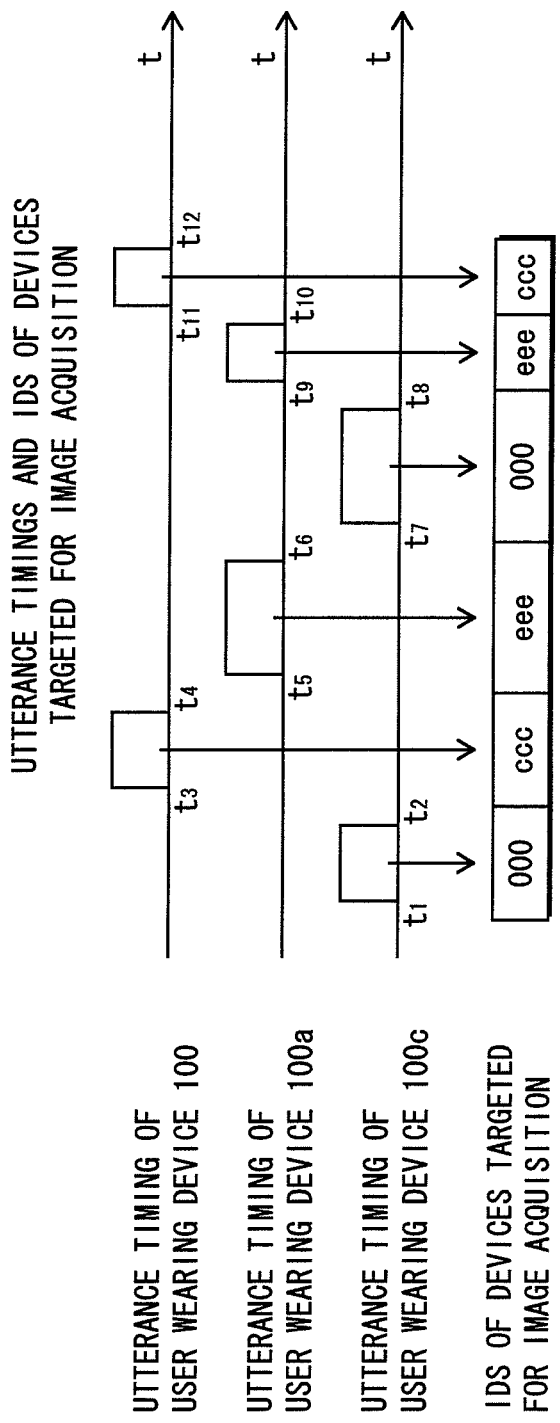
FIG. 17 diagrammatically shows timings of utterances made by speakers and from which device an image of a speaker is to be acquired when the speaker makes an utterance.

The following describes a concrete example of the invention pertaining to embodiment 1. FIG. 17 diagrammatically shows timings of utterances made by speakers and from which device an image of a speaker is to be acquired when the speaker makes an utterance. The first level in FIG. 17 shows utterance timings of the user wearing the device 100. The second level shows utterance timings of a user wearing the device 100a. The third level shows utterance timings of the user wearing the device 100c. The fourth level shows IDS of devices from which images are to be acquired. In FIG. 17, from time t1 to t2 and t7 to t8, the user wearing the device 100c is speaking, and images captured by the device having the device ID 000 (the wearable device 100) are used as images of the speaker. Similarly, from time t3 to t4 and t11 to t12, the user wearing the device 100 is speaking, and images captured by the device having the device ID ccc (the wearable device 100c) are used as images of the speaker. From time t5 to t6 and t9 to t10, the user wearing the device 100a is speaking, and images captured by the device having the device ID eee (the wearable device 100e) are used as images of the speaker.

FIG. 18 corresponds to FIG. 17 and shows a relationship between timings of utterances made by speakers, device IDs of devices targeted for image acquisition, and acquired images. Recording the table shown in FIG. 18 enables knowing from which device a portion of video was acquired.

Figure 19:
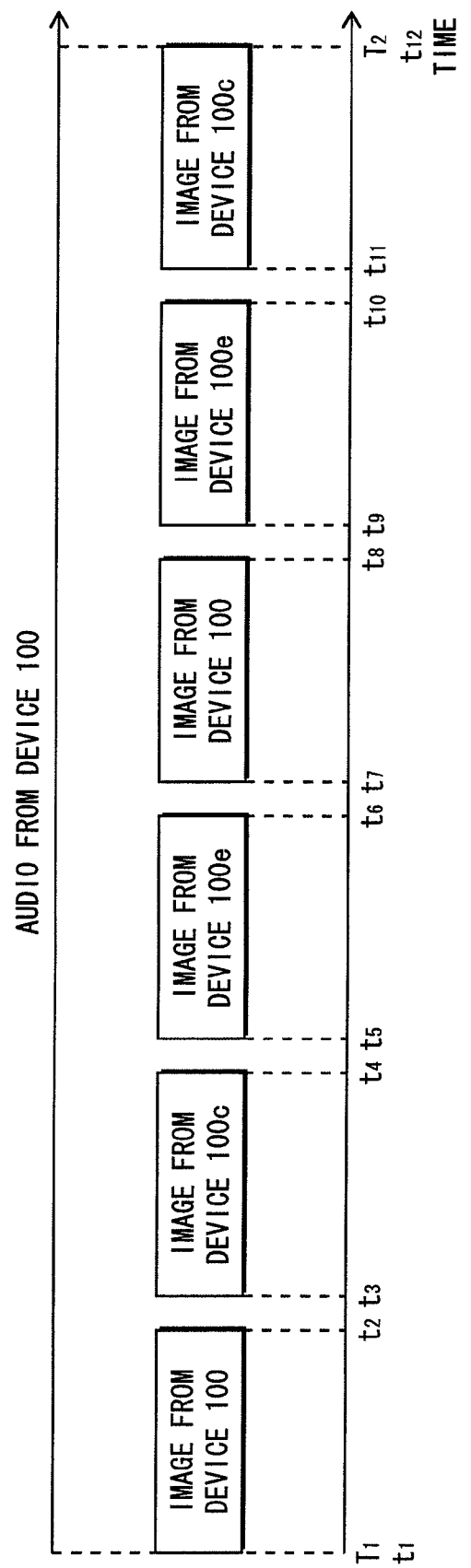
FIG. 19 diagrammatically shows a profile that has been created.

FIG. 19 diagrammatically shows a profile that has been created. Combining audio acquired by the wearable device 100 and images acquired by devices targeted for image acquisition at utterance timings enables creating a stream in which the speaker always appears.

Figure 20:
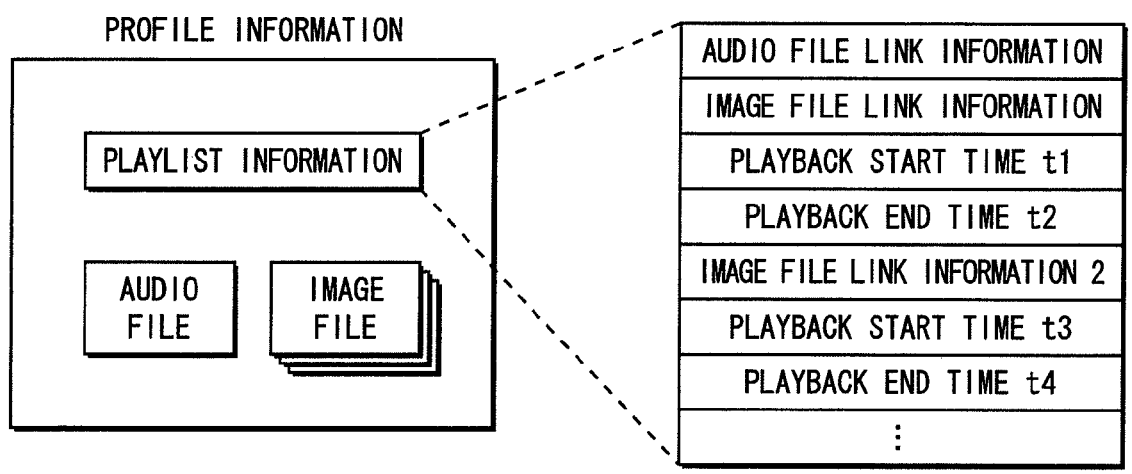
FIG. 20 shows an internal structure of profile information.

FIG. 20 shows an internal structure of profile information. The profile information includes playlist information, an audio file, and image files.

The playlist information defines a playlist and includes audio file link information indicating an audio file, image file link information indicated a corresponding image file, playback start times, and playback end times. This structure enables linking audio information with a plurality of image information pieces.

The audio file is a file storing audio information acquired by the device 100.

The image files are files storing image information acquired by wearable devices in the same conversation group.

According to the structure described in the present embodiment, the wearable device 100 acquires location information, orientation information, and audio information pertaining to the wearable devices 100 to 100h, and with use of the acquired information, detects which wearable devices are in the same conversation group. In the example of FIG. 3, the wearable device 100 detects the wearable devices 100a to 100e (conversation group 1). This eliminates the need to pre-register wearable devices from which data is to be acquired. This structure also enables creating video in which the speaker always appears, without inconveniencing the user, by using images and audio acquired from other wearable devices in conversation group 1.

Embodiment 2

Embodiment 1 describes a structure in which the wearable device 100 detects a wearable device that is to provide an image necessary for a profile, acquires the image from the detected wearable device, and creates a profile using the acquired image (P2P ad-hoc mode).

Figure 21:
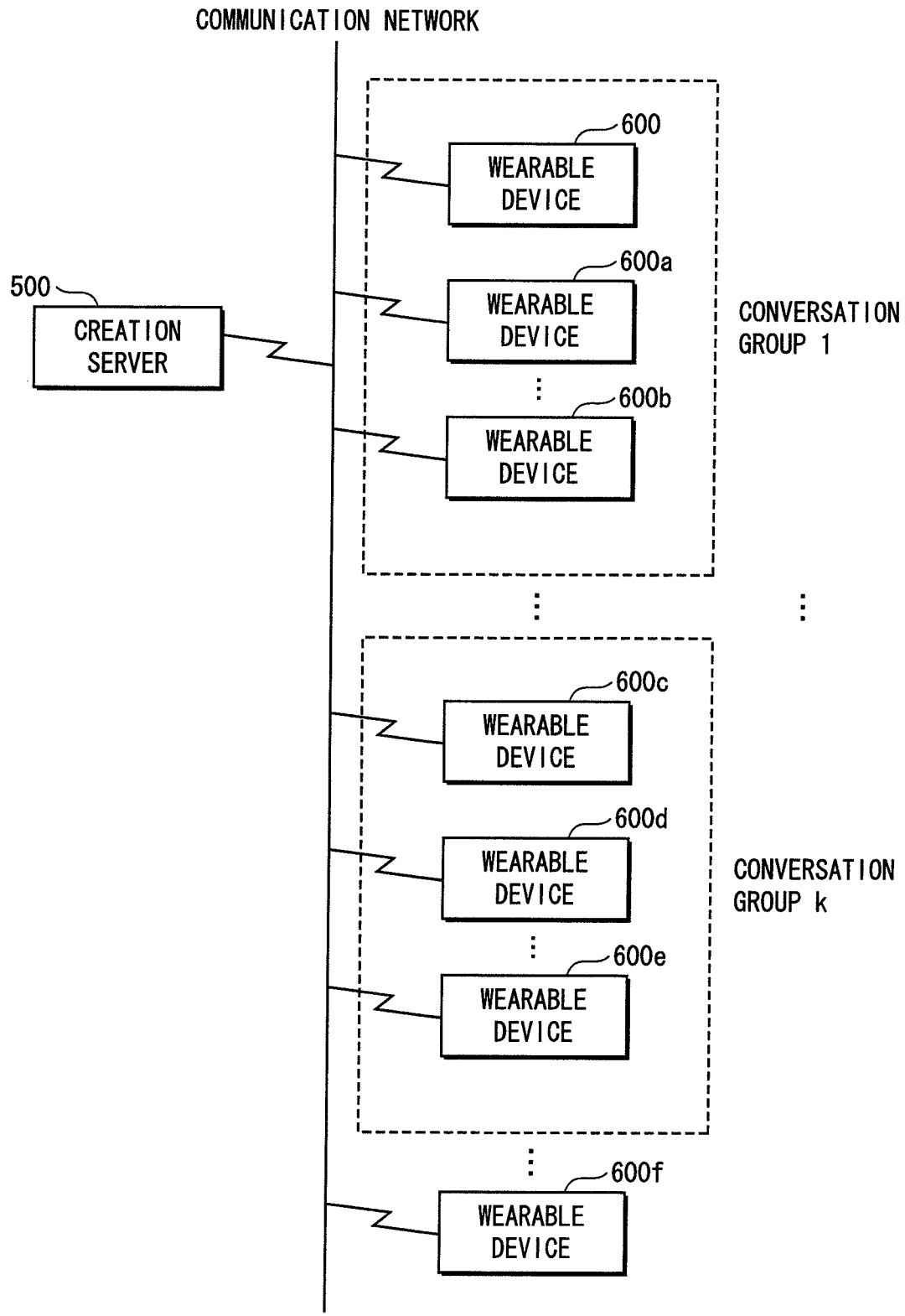
FIG. 21 shows server-managed communication.

In contrast, in the present embodiment, a creation server collectively manages and controls a plurality of wearable devices. As shown in FIG. 21, the creation server determines conversation groups in which audio and images are to be efficiently shared (conversation groups 1 to k), creates a separate profile for each conversation group with use of audio and images acquired from the wearable devices in the conversation groups, and transmits the created profiles to the wearable devices in the conversation groups (server mode using server-based management).

Communication Sequence

Figure 7:
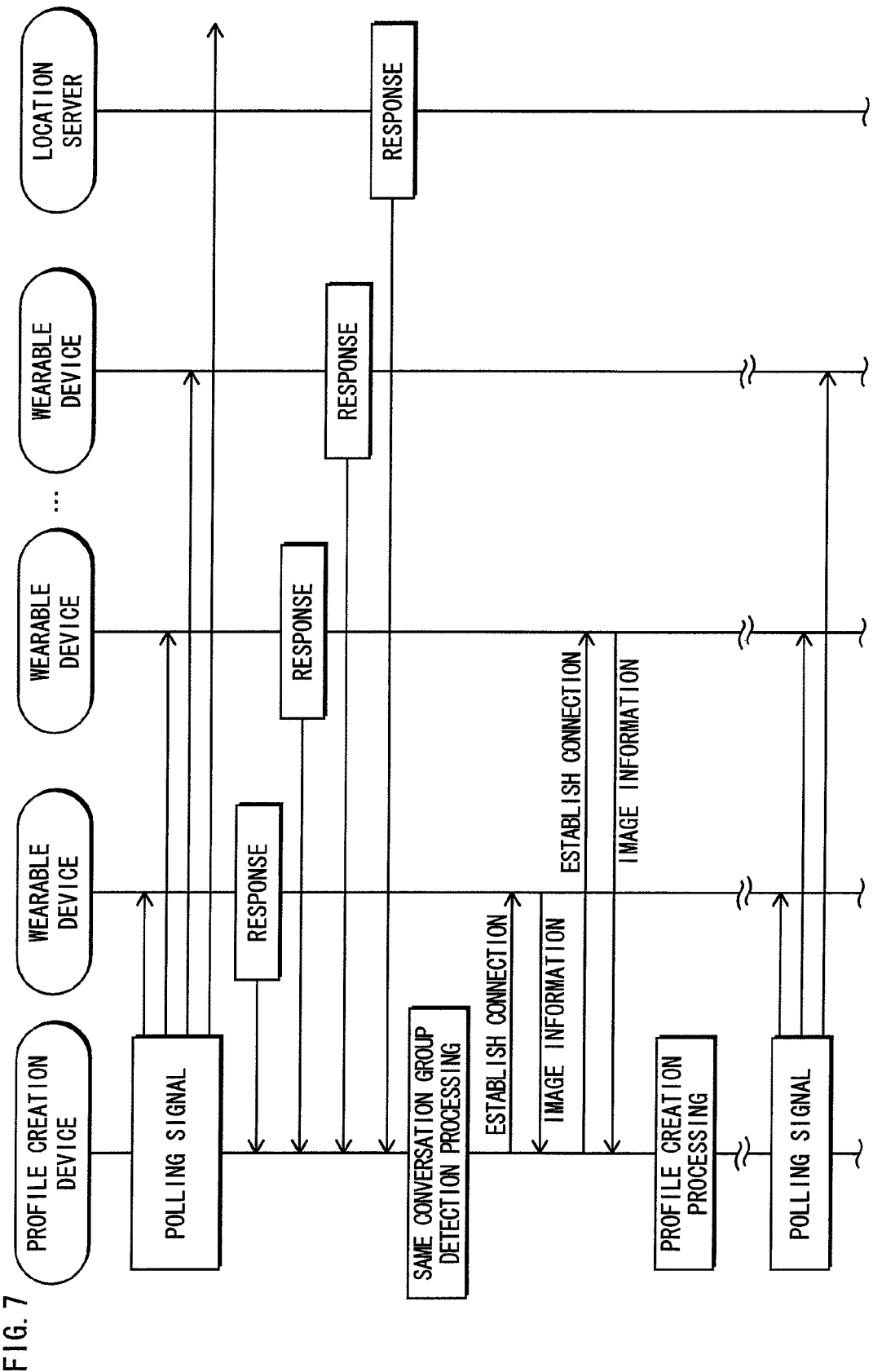
FIG. 7 shows a communication sequence.

The following describes a communication sequence in server-based management. Here, the communication sequence is basically the same as the communication sequence described using FIG. 7.

Creation Server Structure

Figure 22:
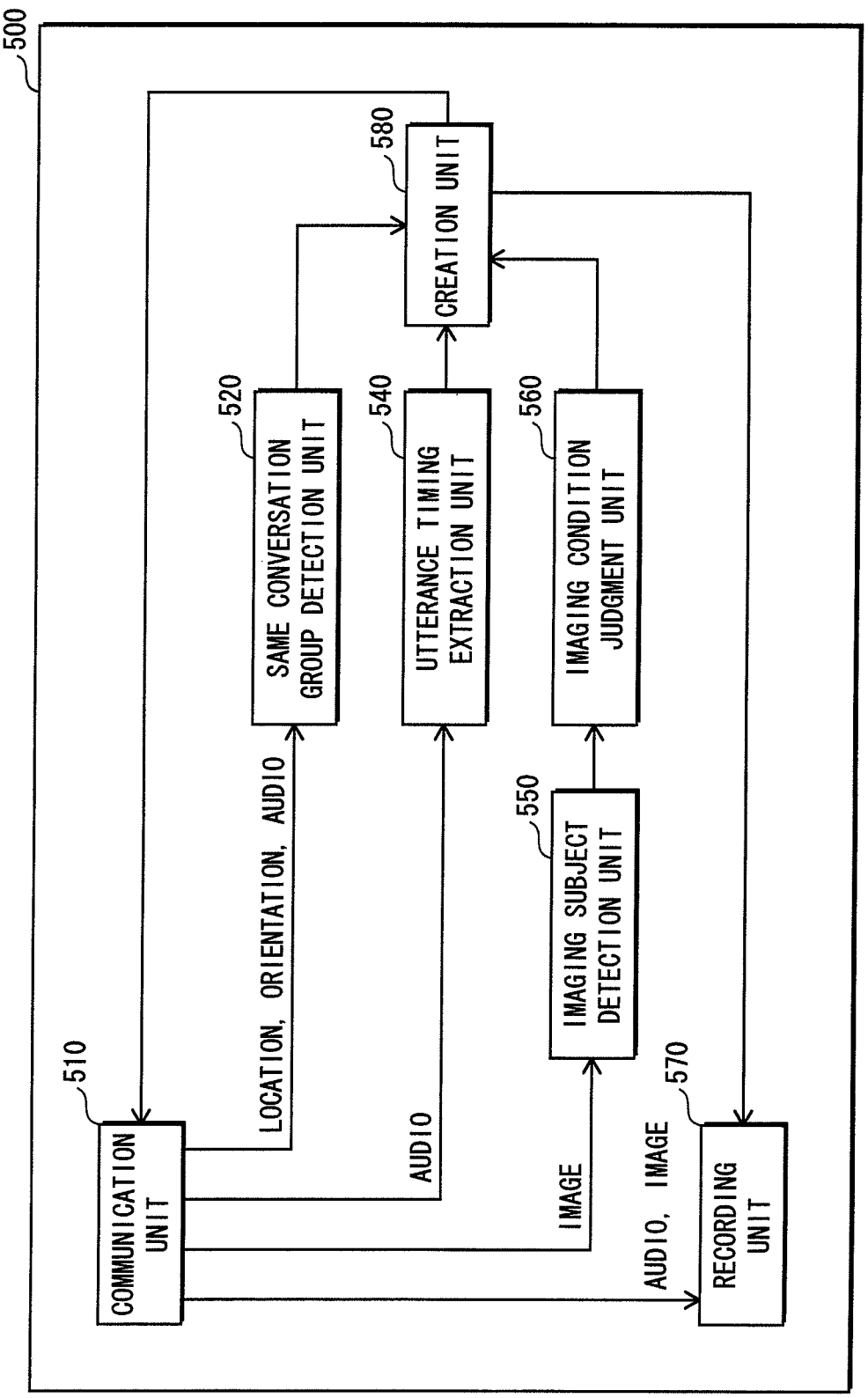
FIG. 22 shows a functional block structure of a creation server 500.

The following describes the internal structure of the creation server 500. FIG. 22 shows a functional block structure of the creation server. The creation server 500 includes a communication unit 510, a same conversation group detection unit 520, an utterance timing extraction unit 540, an imaging subject detection unit 550, an imaging condition judgment unit 560, a recording unit 570, and a creation unit 580.

The communication unit 510 receives orientation information and audio information transmitted from the wearable devices, and receives location information pertaining to the wearable devices from the location server 400. The communication unit 510 transfers the received orientation information, audio information, and location information to the same conversation group detection unit 520, and transfers the audio information to the utterance timing extraction unit 540 and the recording unit 570. The communication unit 510 also receives image information from the wearable devices detected to be in the same conversation groups, and transfers the received image information to the recording unit 570. The communication unit 510 also transmits created profiles to the wearable devices.

Figure 23:
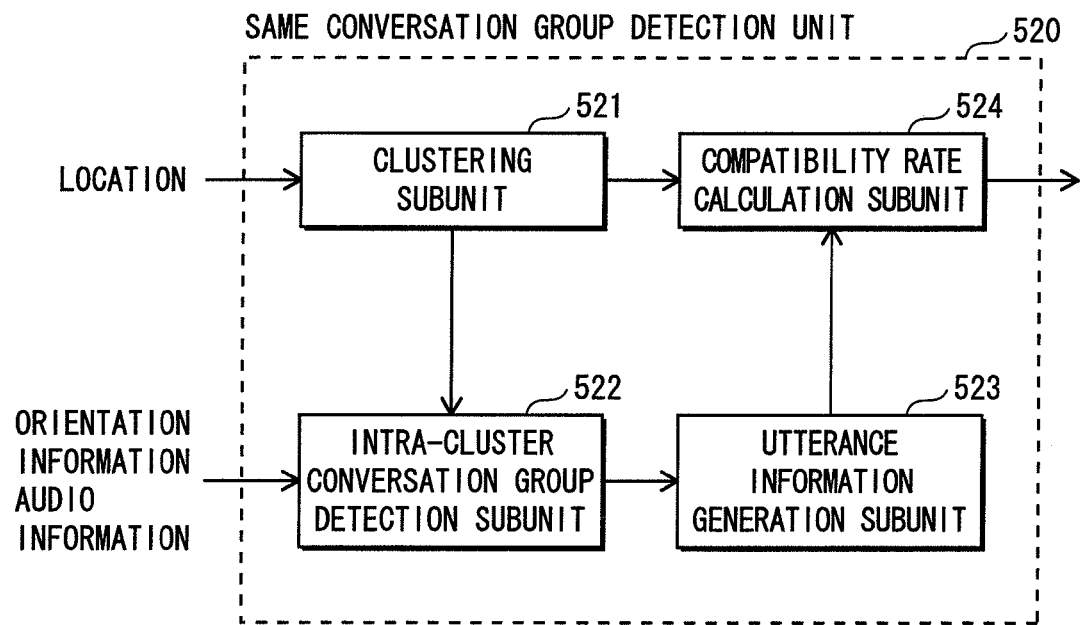
FIG. 23 shows an internal structure of a same conversation group detection unit 520.

As shown in FIG. 23, the same conversation group detection unit 520 includes a clustering subunit 521, an intra-cluster conversation group detection subunit 522, an utterance information generation subunit 523, and a compatibility rate calculation subunit 524.

The clustering subunit 521 receives location information pertaining to the wearable devices from the communication unit 510, and with use of such information, divides the plurality of wearable devices into a predetermined number k0 of clusters. The clustering unit 521 transmits a result of the clustering to the intra-cluster conversation group detection subunit 522. Here, clustering is performed using k-means. The clustering processing is described in more detail later.

The intra-cluster conversation group detection subunit 522 receives the result of clustering from the clustering subunit 521. For each cluster, the intra-cluster conversation group detection subunit 522 calculates a rate of overlap in utterances with use of the audio information acquired by devices in the cluster, and detects k conversation groups in accordance with the calculated overlap rates, location information, and orientation information. The intra-cluster conversation group detection subunit 522 transmits the detection results to the utterance information generation subunit 523.

The utterance information generation subunit 523 receives the conversation group detection results from the intra-cluster conversation group detection subunit 522, and generates utterance information pertaining to speakers in the conversation groups (speaking time rate, and frequency of speaker changing). The speaking time rate refers to a percentage of a total conversation time that an individual is speaking. The utterance information generation subunit 523 calculates an utterance time rate for each speaker. The frequency of speaker changing refers to a number of times that a change in speaker has occurred in a conversation group per unit of time.

Furthermore, the utterance information generation subunit 523 calculates a conversation activity rate for each conversation group with use of the utterance information, and outputs the calculated conversation activity rates to the compatibility rate calculation subunit 524. The conversation activity rate is defined so as to have a higher value the more even the speaking time rates of the speakers are or the higher the rate of change in speaker is, thereby indicating that the conversation is active.

The compatibility rate calculation subunit 524 receives location information from the clustering subunit 521, receives conversation activity rates and orientation information from the utterance information generation subunit 523, and generates mobility rate information with use of the location information and orientation information. If an individual in a cluster does not belong to a conversation group, and furthermore there are a plurality of conversation groups in that conversation group, the compatibility rate calculation subunit 524 calculates the individual's conversation group compatibility rate with respect to each of the conversation groups in the cluster. The conversation group compatibility rate is calculated with use of location information, orientation information, and mobility rate information pertaining to the individual, as well as the conversation activity rate of a targeted conversation group. The conversation group compatibility rate is defined so as to have a higher value the closer the location of the individual is to the conversation group, the more the individual is facing in the direction of the conversation group, the more the individual has moved toward the conversation group, and the higher the activity rate of the conversation group is, thereby indicating a high compatibility rate. As a result, the individual who did not belong to a conversation group is caused to be included in the group that has the highest conversation group compatibility rate.

The utterance timing extraction unit 540, imaging subject detection unit 550, imaging condition judgment unit 560, and creation unit 580, are similar to the utterance timing extraction unit 126, imaging subject detection unit 129, imaging condition judgment unit 130, and creation unit 131 described in embodiment 1.

The recording unit 570 appropriately stores the audio information and image information received from the wearable devices via the communication unit 510. The recording unit 570 also records profiles created by the creation unit 580.

Structure of the Wearable Device

Figure 24:
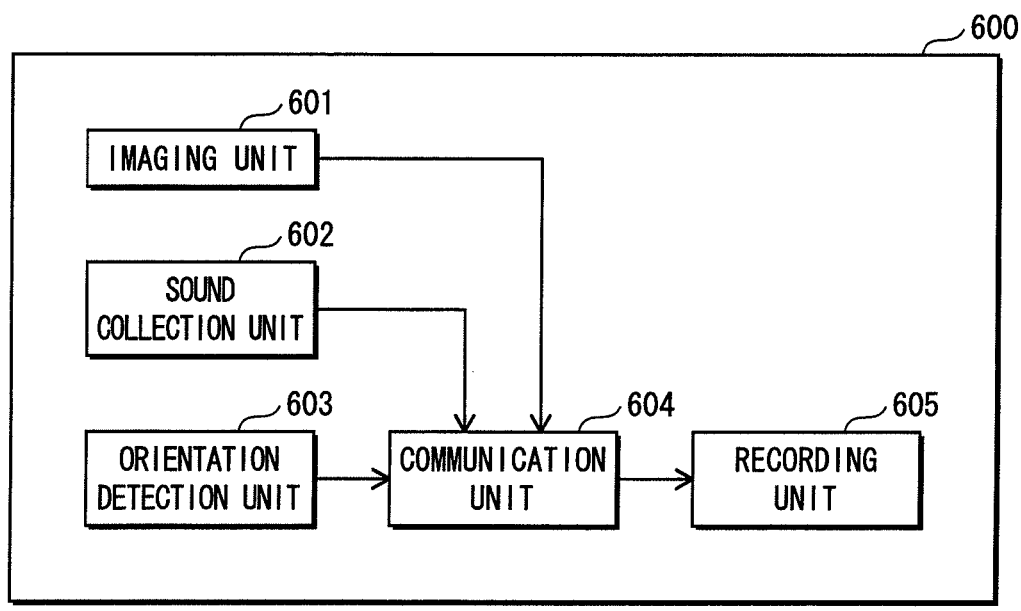
FIG. 24 shows a functional block structure of a wearable device 600.

The following describes the internal structure of the wearable device 600. FIG. 24 shows a functional block structure of the wearable device 600. The wearable device 600 includes an imaging unit 601, a sound collection unit 602, an orientation detection unit 603, a communication unit 604, and a recording unit 605.

The imaging unit 601, sound collection unit 602, and orientation detection unit 603 are similar to the imaging unit 121, sound collection unit 122, and orientation detection unit 125 described in embodiment 1.

The communication unit 604 transmits orientation information and audio information to the creation server 500, and receives a profile from the creation server 500. The communication unit 604 transfers the received profile to the recording unit 605.

The recording unit 605 receives the profile from the communication unit 604, and records the profile to a recording medium.

Operations of the Creation Server

Figure 25:
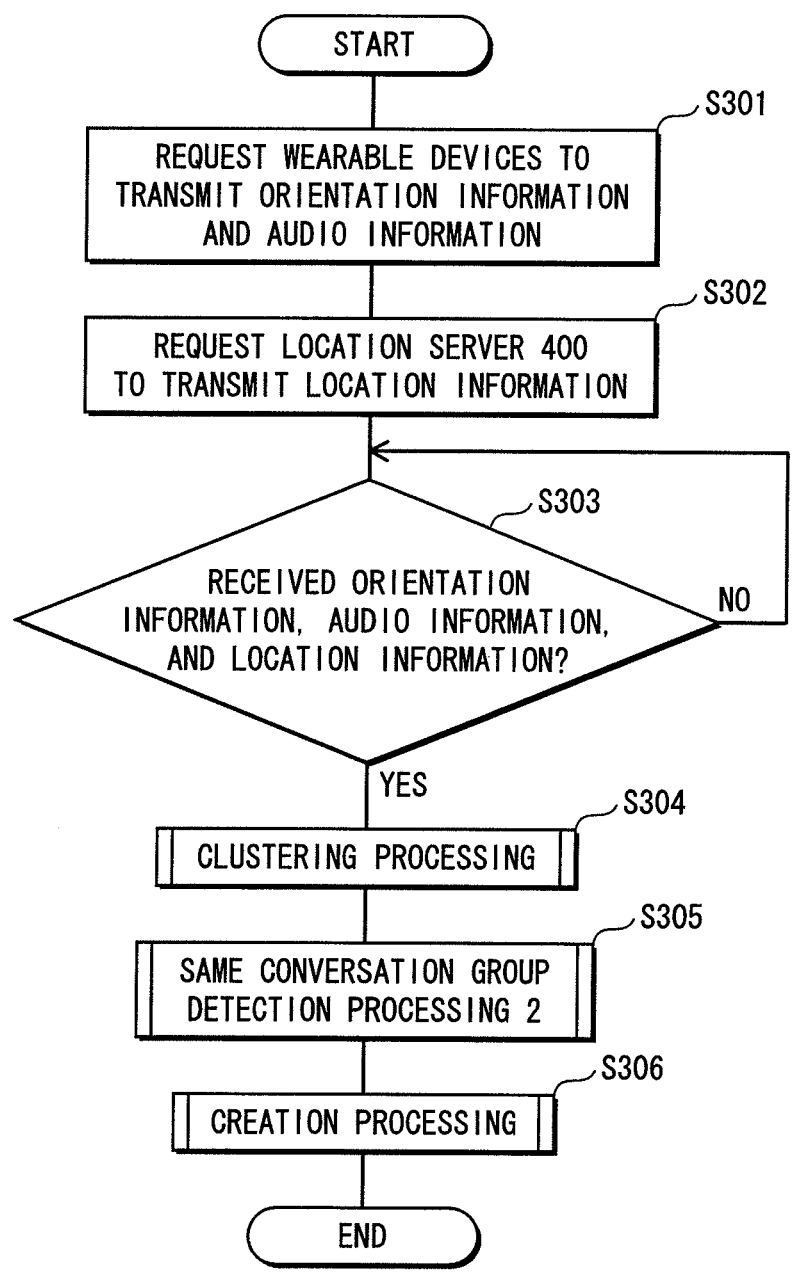
FIG. 25 is a flowchart showing processing executed by the creation server.
Figure 26:
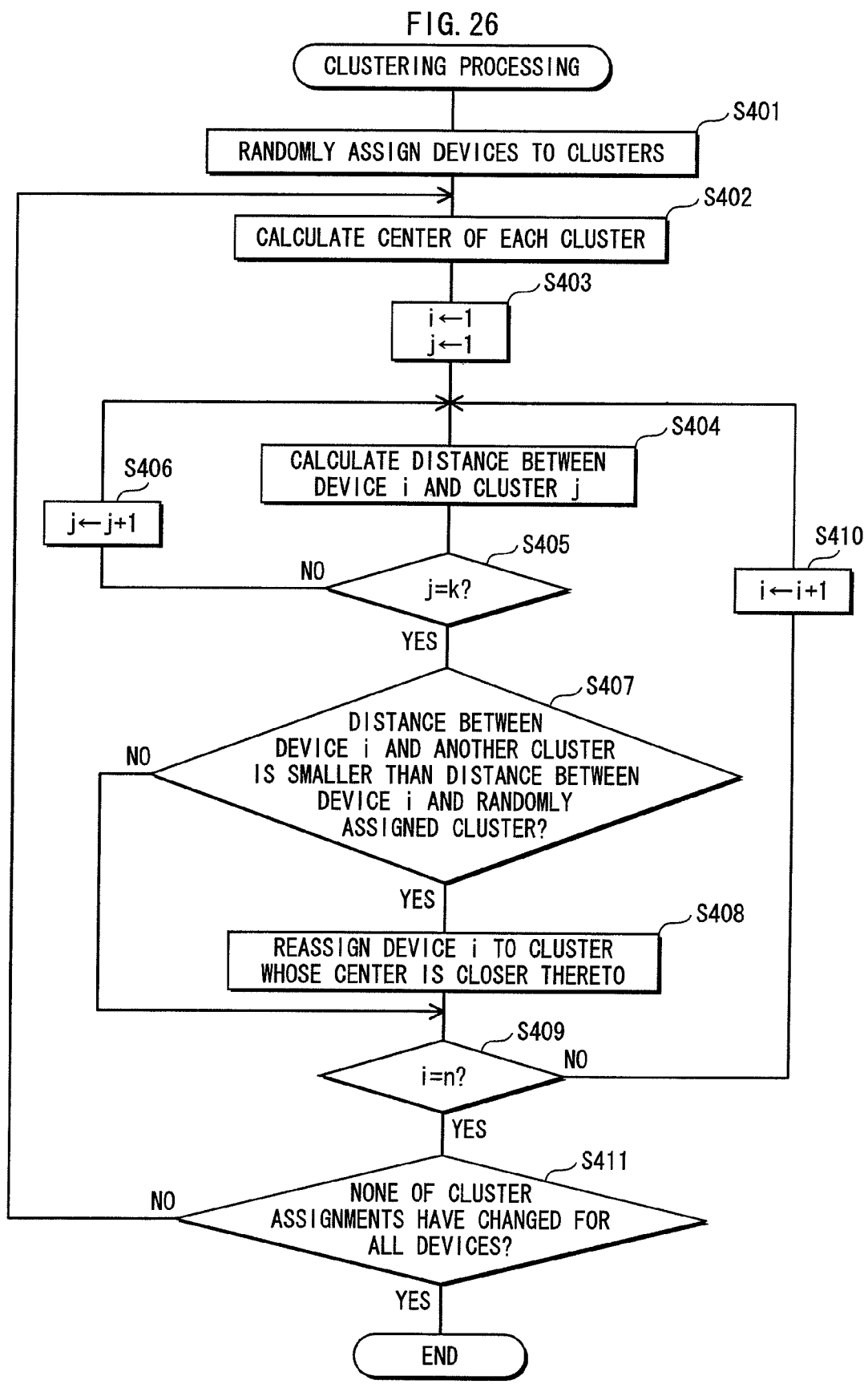
FIG. 26 is a flowchart showing clustering processing.
Figure 27:
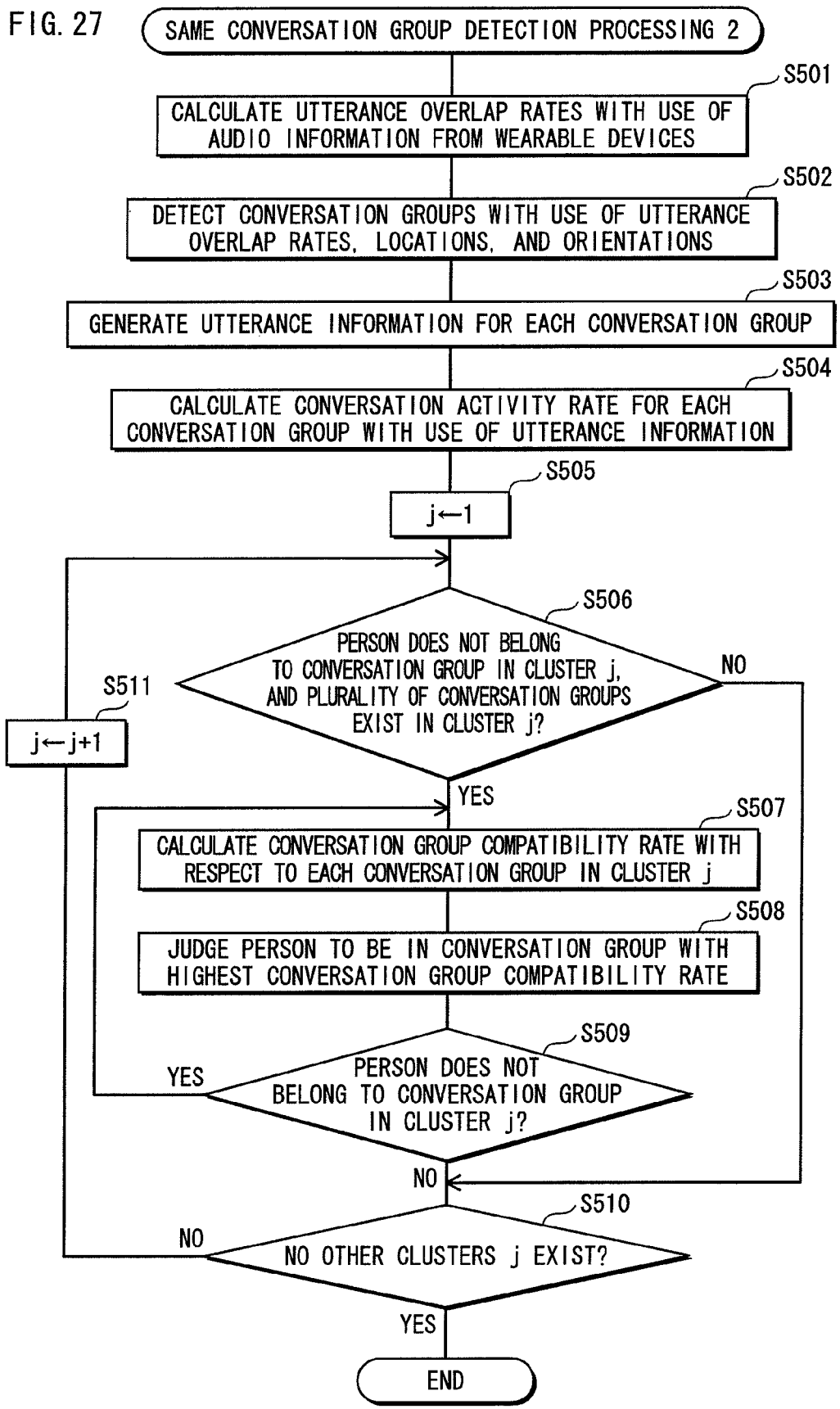
FIG. 27 is a flowchart showing same conversation group detection processing 2.

The following describes a flow of processing performed by the creation server 500 with reference to FIGS. 25 to 27. Firstly, the creation server 500 requests the wearable devices to transmit their orientation information and audio information (step S301). The creation server 500 then requests the location server 400 to transmit the location information pertaining to the wearable devices (step S302). Upon receiving the orientation information, audio information, and location information (step S303:YES), the creation server 500 performs clustering processing (step S304) to divide the wearable devices into a plurality of clusters. After the wearable devices have been divided into clusters, the creation server 500 performs same conversation group detection processing 2 for each cluster (step S305) to detect conversation groups in each cluster. The creation server 500 then performs creation processing for each conversation group (step S306) to create profiles. Note that the creation processing referred to here is similar to the creation processing that is shown in FIGS. 15 and 16 and described in embodiment 1.

Clustering Processing

The following describes clustering processing.

FIG. 26 is a flowchart showing clustering processing. In the flowchart of FIG. 26, the variable i indicates a device, the variable j indicates a cluster, the variable n indicates the total number of devices, and the variable k indicates the total number of clusters. Firstly, the creation server 500 randomly assigns devices xi (i=1 . . . n) to clusters (step S401), and calculates a center Vj (j=1 . . . k) of each cluster based on the devices assigned thereto (step S402). The calculation of step S402 uses the average (center) of elements of the devices assigned to the clusters. Next, the creation server 500 initializes i and j (step S403), and calculates a distance between device xi and the center Vj of the cluster in which it is assigned (step S404). The creation server 500 judges whether j equals k (step S405), and if j does not equal k, increments j by 1 (step S406), and returns to step S404. If j equals k, the creation server 500 judges whether another cluster is closer to device xi than the cluster to which device xi was randomly assigned (step S407). If another cluster is closer to the device xi, the creation server 500 re-assigns device xi to the cluster whose center is closest to the device xi (step S408). After the re-assigning has been performed, or in a case of step S407:NO, the creation server judges whether i equals n (step S409). If i does not equal n, the creation server 500 increments i by 1 (step S410), and returns to step S404. If the none of the cluster assignments have changed for each device xi in the above processing, processing ends (step S411:YES). Otherwise, the creation server calculates re-calculates the center Vj of the cluster to which a device has been assigned and repeats the above processing (return to step S402). As a result of this processing, devices that are close to each other are assigned to the same cluster.

Same Conversation Group Detection Processing 2

The following describes same conversation group detection processing 2. FIG. 27 is a flowchart showing same conversation group detection processing 2. In the flowchart of FIG. 27, the variable j indicates a cluster. Firstly, for each cluster, the creation server 500 calculates utterance overlap rates with use of audio information from the devices in the cluster (step S501). The creation server 500 then detects conversation groups with use of the calculated utterance overlap rates, location information, and orientation information (step S502). Specifically, the creation server 500 performs the processing of steps S106 to 117 in FIGS. 13 and 14 on combinations of wearable devices in each cluster. Specifically, if wearable devices in one pair of wearable devices judged to be in the same conversation group are judged to be in the same conversation group as another pair of wearable devices, all of these devices are detected to be in the same conversation group. For example, in the example of FIG. 21, conversation group 1 was formed as a result of judging that wearable devices 600 and 600a, 600a and 600b, and 600b and 600 are in the same conversation group as each other.

Next, the creation server 500 generates utterance information for each conversation group (step S503), and calculates a conversation-activity rate for each conversation group based on the calculated utterance information (step S504). After calculating the conversation activity rates, the creation server 500 initializes j (step S505). If an individual does not belong to a conversation group in a cluster, the creation server 500 judges whether the cluster includes a plurality of conversation groups (step S506). In the case of judging affirmatively, the creation server 500 calculates the individual's conversation group compatibility rate with respect to each conversation group in the cluster (step S507), and determines the individual to belong to the conversation group with which the individual has the highest conversation group compatibility rate (step S508). The creation server 500 then judges whether any other individuals do not belong to a conversation group in a cluster (step S509). If another individual does not belong to a conversation group, the creation server returns to step S507. If all individuals belong to a conversation group, or in a case of judging negatively in step S506, the creation server 500 judges whether another cluster j exists (step S510). If another cluster j exists, the creation server 500 increments j by 1 (step S511), and returns to step S506. If another cluster j does not exist, processing ends.

Concrete Example of Same Conversation Group Detection Processing 2

FIG. 28(a) is an overhead map showing locations of 21 individuals at a certain time. Although not depicted in FIG. 28(a), the same system as in FIG. 6 has acquired location information pertaining to the devices. FIG. 28(b) shows a result of clustering performed by the clustering subunit 521. Here, there are three clusters. FIG. 28(c) illustrates a person's direction and activeness in others' conversation. FIG. 28(d) shows conversation groups that have been detected by the intra-cluster conversation group detection subunit 522. Here, two conversation groups, namely conversation group 1-1 and conversation group 1-2, have been detected in cluster 1. Also, two conversation groups, namely conversation group 2-1 and conversation group 2-2, have been detected in cluster 2. Furthermore, one conversation group, namely conversation group 3-1 has been detected in cluster 3. FIG. 28(e) shows the conversation groups that all of the participants have been divided into. FIG. 28 shows that conversation group 1-1 and 1-2 have been expanded so as to include individuals with a low conversation participation frequency or individuals not participating in a conversation.

According to the above-described embodiment, the creation server 500 divides wearable devices targeted for management into clusters, determines conversation groups in each cluster, and easily creates profiles for each conversation group with use of audio and images acquired from wearable devices in the conversation groups. Using a method of first roughly dividing devices into clusters with use of location information enables reducing the number of attempts when finding conversation groups among a plurality of individuals at one time, which significantly cuts back the amount of operations performed.

Embodiment 3

In embodiments 1 and 2, whether wearable devices are in the same conversation group is detected based on an overlap rate of utterance intervals. However, instead of using only the overlap rate of utterance intervals, interjectory responses used to indicate understanding of what a speaker is saying can be detected and used in same conversation group detection processing. The present embodiment describes a case where interjectory responses are used in same conversation group detection processing. Here, an interjectory response refers to an utterance that includes a lengthened vowel sound, such as "heh", "hoh", or "fuhn". Interjectory responses often include lengthened vowel sounds, and are often independent phrases. Therefore, it is possible to simply detect interjectory responses by detecting vowel sounds using a parameter indicting a value that is characteristic to vowel sounds, such as a cepstrum or LPC coefficient, and using a judgment method based on conditions such as whether the vowel sound continues for 200 [msec] to 2 [sec]. The method of detecting interjectory responses is of course not limited to the example described above.

In conversations, interjectory responses often occur during another person's utterance interval. Interjectory responses follow a pattern such as, while a speaker A is speaking, a speaker B who is listening will make an interjectory response. Therefore, if the utterances of speakers A and B overlap, and furthermore the utterance of speaker B is at the head of the speaker B's utterance interval and is an interjectory response, the utterance of speaker B is not considered to be an overlapping interval, thereby reducing the utterance overlap time, which would be expected to increase the possibility of speakers A and B being detected to be in the same conversation group.

Interjectory responses also often follow a pattern such as, after speaker A has finished speaking, speaker B makes an interjectory response regarding what speaker A said, and then begins to speak independently. This is a conversational technique in which an interjectory response is used as a bridge to continue the conversation. When this type of pattern is seen, the speakers A and B can be judged to very likely be in the same conversation group. When this type of pattern is detected, the speakers may be judged to be in the same conversation group, even if the overlap rate between the speakers is, for example, 90 to 95%.

According to the above structure, the present embodiment enables increasing the precision of detecting whether devices are in the same conversation group, by detecting interjectory responses.

Supplementary Remarks

Although wearable devices pertaining to the present invention have been described based on the embodiments, the present invention is of course not limited to the above embodiments.

In the above embodiments, the method for detecting the location of wearable devices uses infrared tags and infrared wide-angle cameras. However, the present invention is not limited to this. For example, locations may be detected with use of GPS, ultrasound waves, a wireless LAN, RF-ID tags, or another method. In the exemplary case of detecting locations with use of GPS, location information is acquired from the wearable devices.

Although the wearable devices are described as camera-type devices in the above embodiments, the wearable devices may be watch-type, pen-type, glasses-type, etc.

Although a wearable device is worn as shown in FIG. 1 in the above embodiments, the present invention is not limited to this. A device may be attached to the chest area with a pin, be worn as glasses, or be shaped as headphones and worn appropriately.

Although a wireless LAN is used as the communication system in the embodiments, Bluetooth or another communication system may be used. Any system that enables the transmission of information such as images, audio, locations, orientations, etc. may be used, such as packet communication using wireless communication, wired communication, or an IP network.

Although conversation groups are detected with use of audio information, location information, and orientation information in the embodiments, conversation groups may be detected with use of only audio information. Since audio can only be acquired in a range of a few meters, and audio cannot be collected over longer distances, distance can be estimated to a certain degree according to whether or not audio can be collected. In other words, if audio cannot be collected by a certain device, the device is not considered to be in the same conversation group as the wearable device pertaining to a user who is speaking. Conversation groups may also be detected with use of audio information and location information, or with use of audio information and orientation information.

Although wearable devices are detected as being in conversation groups in the embodiments, the detection is not limited to conversation groups. For example, in a certain place, wearable devices may be detected as sharing a same interest, or as simply being close together.

In the embodiments, the device from which an image of a speaker is to be acquired while the speaker is speaking is determined with use of an evaluation function. However, a plurality of devices having high evaluations may be selected, and a profile may be created by combining images acquired from the selected plurality of devices. This structure enables a video from various angles to be obtained.

In the above embodiments, the creation unit 131 creates a profile by joining together video pieces in which the speaker always appears. However, a single stream in which only a specified person appears may be created. In the exemplary case of creating a video pertaining to the user of the wearable device 100, the wearable device 100 may combine images of the user selected with use of the evaluation function and audio acquired by the wearable device 100, without taking utterance timings into consideration. The following is a specific description of a processing flow in this case.

Figure 29:
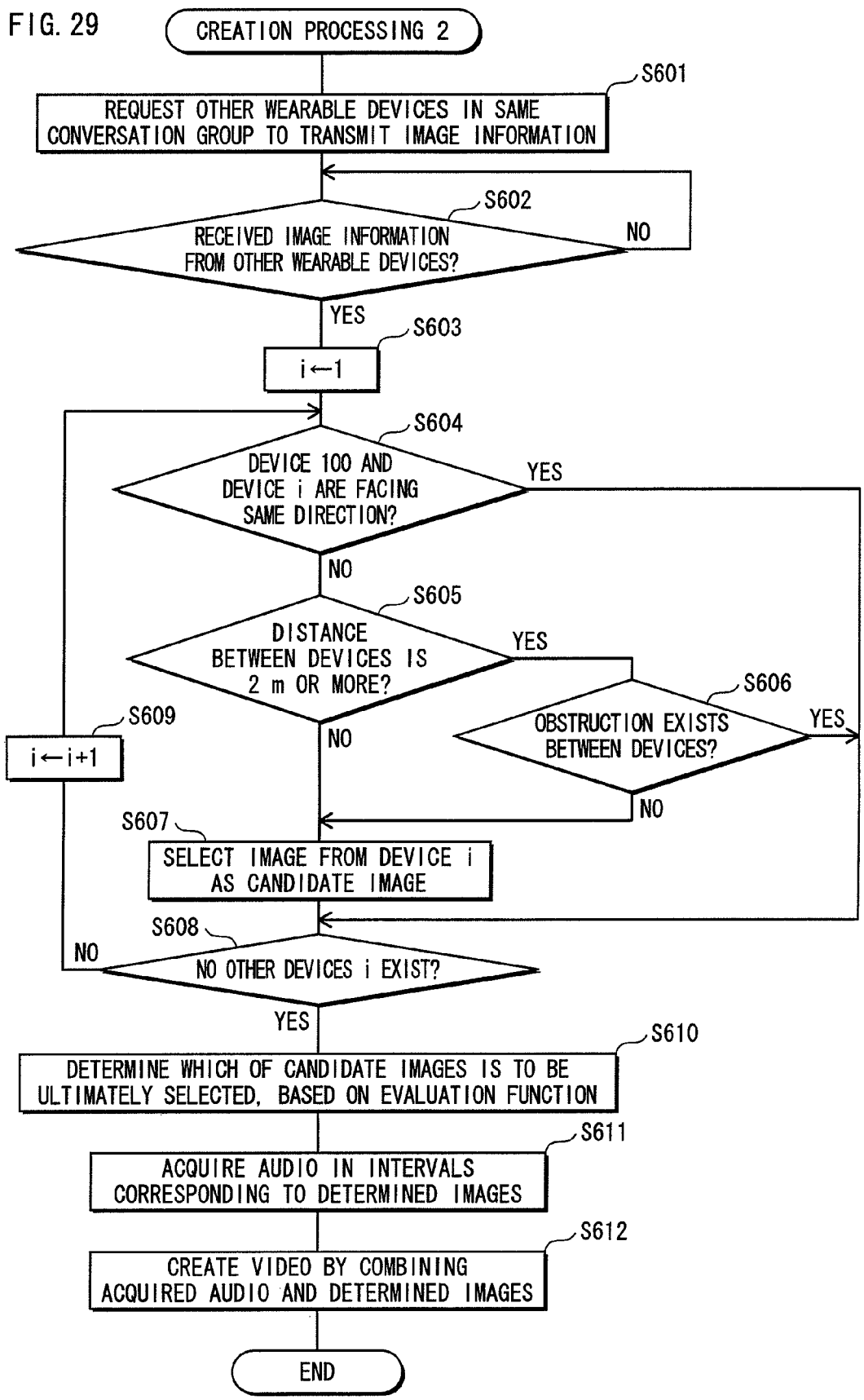
FIG. 29 is a flowchart showing creation processing 2.

FIG. 29 is a flowchart showing creation processing 2. In the flowchart of FIG. 29, the variable i specifies a wearable device. Firstly, the wearable device requests other wearable devices judged to be in the same conversation group to transmit image information (step S601). Upon receiving image information from the other wearable devices (S602:YES), the wearable device initializes i (step S603). After initializing i, the wearable device judges whether the device 100 and device i are facing the same direction (step S604).

If the devices are facing different directions (step S604: NO), the wearable device judges whether a distance from the other device is greater than or equal to 2 m (step S605). If the distance between the devices is less than 2 m (step S605:No), an image acquired from the other device is selected as a candidate image for profile creation (step S607). If the distance between the devices is 2 m or greater (step S605:YES), the wearable device judges whether an obstruction exists between itself and the other device (step S606). Upon judging that an obstruction does not exist (step S606:NO), an image acquired from the other device is selected as a candidate image for profile creation (step S607).

If the devices are judged to be facing the same direction (step S604:YES), if an obstruction is judged to exist between the devices (step S606:YES), or after the processing of step S607 has been performed, the wearable device judges whether another device i exists (step S608) If another device i exists, the wearable device increments i by 1 (step S609), and returns to step S604. If another device i does not exist, the wearable device determines which of the selected candidate images is to be used, based on an evaluation function. The wearable device then acquires the audio of an interval corresponding to the determined image (step S611), and creates a video by combining the audio and image (step S612).

Although an image to be used in the profile is selected based on an evaluation function in the embodiments, a simple method of sequential selection beginning with a device in closest proximity may be used.

In the embodiments, the existence of an obstruction is determined by a method of judging, with use of location information, whether a third device exists between a certain device and a device pertaining to the speaker in the same conversation group, as well as by analyzing an image acquired from the certain device and judging that an obstruction does not exist if an image of a face can be detected in the acquired image. However, additionally, the wearable device may judge whether the detected image of a face matches a directional vector formed by the device 100 and the other device, and upon judging affirmatively, judge that an obstruction does not exist.

Although the evaluation function is F=f(d, p, snr) in the embodiments, the present invention is not limited to this. The evaluation target may be redundancy achieved by continuously selecting the same image (the longer the same image is continuously selected, the worse the redundancy). Here, the redundancy is calculated based on temporal length.

In step S111 of FIG. 13 in the embodiments, two devices are judged to be moving in the same direction if the amounts of change in location and orientation are the same. However, two devices may be judged to be moving in the same direction if the amounts of change in location and orientation of the two devices are in a predetermined range.

Although image information is acquired from wearable devices in the same conversation group and used in profile creation in the embodiments, audio information may be acquired, and a log regarding a conversation may be acquired. There are cases where, for example, video is being captured by the wearable device 100, but the audio captured by the wearable device 100 does not include audio of a speaker who is in the same conversation group but a little far away. In this case, using the audio collected by the device pertaining to the speaker enables the wearable device 100 to record clear audio. Also, a clear log of the conversation can be recorded by using the conversation logs of both devices.

Also, the acquisition of data (images, audio, a log, etc.) from other wearable devices in the same conversation group does not need to be performed in real-time.

Although the conversation group detection processing is performed at a certain interval in the embodiments, the conversation group detection processing may be performed each time the location information of the wearable devices has changed. If the location information has changed, video to be shared should be provided in accordance with the conversation groups to which the users of wearable devices belong. For example, in FIG. 2, the user of the wearable device 100b may acquire video of the conversation in conversation group 1 while in conversation group 1, and after moving into conversation group 2, acquire video of the conversation in conversation group 2. Upon moving into a conversation group during a conversation, there are often cases in which the user desires to catch up on the previous content of the conversation in the new conversation group. In such a case, the wearable device may include a mechanism that enables the prior content of the conversation in the conversation group to be played back in a short period of time.

In embodiment 1, the device IDs of devices in the same conversation group are recorded in correspondence with audio, image, and times. However, as shown in FIG. 30, the orientation information and location information of the devices, as well as audio acquired from the devices, etc. may be recorded in correspondence with the device IDs. This structure enables keeping a record of orientations and locations pertaining to captured video, thereby making it possible to, for example, identify whether there is backlighting with use of the orientation information, or automatically record where video or audio information was captured with use of the location information.

In embodiment 1, the wearable device 100 detects other wearable devices in the same conversation group and creates a profile. However, the wearable device 100 may detect other wearable devices in the same conversation group, and a server may perform profile creation.

In embodiment 1, the wearable device 100 performs same conversation group detection processing and profile creation processing. However, when a conversation begins, the device being worn by the first speaker may perform same conversation group detection processing and profile creation processing for all members of the conversation. Also, each device may individually perform same conversation group detection processing at separately determined intervals, and profile creation processing may be performed for all of the devices by the device worn by the first speaker, by an arbitrary device in the conversation group, or by the device whose user has spoken the longest.

In embodiment 2, the wearable devices are divided into clusters with use of the location information. However, the orientation information of the wearable devices may be used to shift the center location of a person in the direction they are facing, or mobility rate information may be used to shift the center location of a person in the direction in which the person is moving, thereby influencing the center location of the group as a whole. Also, the number of clusters k0 may be changed according to the number of detected participants. For example, the number of clusters k0 may be increased as the number of participants increases.

In embodiment 2, a person who is not speaking is assigned to a conversation group by obtaining a compatibility rate. However, there is no need to assign a non-speaking person to a conversation group as shown in FIG. 28(e). The judgment result shown in FIG. 28(d) is acceptable.

Also, processing for assigning wearable devices to conversation groups is not limited to the same conversation group detection processing described in embodiments 1 and 2. Conversation groups may be detected based on lower conversation overlap rates, closer locations, or the more that devices are facing each other.

In embodiment 2, a profile created by the creation server 500 is transmitted to the wearable devices, which record the received profile. However, the wearable devices may include a video playback unit, and the creation server may stream the profile to the wearable devices. Also, if the wearable devices do not include a viewer, the devices may simply be sensor devices.

In the embodiments, conversation groups are detected with use of an overlap rate of audio. However, the audio collection unit may perform audio-to-text conversion with use of the acquired audio information to generate text information, and conversation groups may be detected based on the generated text information and text information pertaining to other devices that has been acquired via the communication unit. For example, two devices may be detected to be in the same conversation group if the text information of each device includes a keyword a certain number of times of more.

The embodiments describe a device arrangement in which various people are speaking at their own initiative (a party-type device arrangement). However, the present invention can also be applied to a device arrangement in which one person is speaking to a large group of people (a school-type device arrangement), or a device arrangement in which a large group of people are lined up and speaking while viewing one thing (a viewing-type device arrangement).

In the case of server-based management system of embodiment 2, the server apparatus performs clustering processing. Even in the case of the P2P ad-hoc mode described in embodiment 1, the wearable devices may perform clustering processing.

INDUSTRIAL APPLICABILITY

The present invention is useful in a situation in which people in close proximity to each other are wearing wearable devices.

The invention claimed is:

1. A wearable device comprising:
   a same conversation group detection unit operable to request that each of a plurality of other wearable devices transmit a response including first audio information acquired by the other wearable devices;
   a communication unit operable to receive the responses from the plurality of other wearable devices; and
   an overlap rate calculation unit operable to calculate an overlap rate between (i) an utterance interval in second audio information acquired by said wearable device at the same time and location the first audio information is acquired by the other wearable devices and (ii) an utterance interval in the first audio information acquired by each of the other wearable devices and received by said communication unit, wherein
   said same conversation group detection unit is further operable to detect, from among the plurality of other wearable devices, a group-participant wearable device of the plurality of other wearable devices that belongs to a same conversation group as said wearable device, by using at least the calculated overlap rates.

2. The wearable device of claim 1, wherein
   the same conversation group detection unit detects, as the group-participant wearable device in the same conversation group, the group-participant wearable device for which the overlap rate pertaining thereto is less than or equal to a predetermined threshold value.

3. The wearable device of claim 1, wherein,
   one or more of the utterance intervals in the first audio information include an interjectory response, which is an utterance interval portion in which a vowel sound continues for a predetermined time period, and
   the overlap rate calculation unit excludes the one or more utterance intervals including the interjectory response when calculating the overlap rates.

4. The wearable device of claim 1, wherein
   each of the responses further includes location information,
   said wearable device further comprises:
   a distance calculation unit operable to calculate a distance between said wearable device and each of the other wearable devices with use of own location information of the wearable device and the location information received from the other wearable devices by said communication unit, and
   said same conversation group detection unit detects the other wearable device that belongs to the same conversation group further with use of the calculated distances.

5. The wearable device of claim 4, wherein
   said same conversation group detection unit detects, as the group-participant wearable device in the same conversation group, the group-participant wearable device for which at least the overlap rate pertaining thereto is less than or equal to a first threshold value, and furthermore the distance pertaining thereto is less than or equal to a second threshold value.

6. The wearable device of claim 1, wherein
   said same conversation group detection unit is further operable to compare (i) audio of a wearer of said wearable device included in the second audio information acquired by said wearable device and (ii) environmental audio included in the second audio information acquired by said wearable device, and
   said same conversation group detection unit detects the group-participant wearable device that belongs to the same conversation group further with use of a result of the comparison.

7. The wearable device of claim 1, wherein
   said same conversation group detection unit is further operable to compare (i) environmental audio included in the second audio information acquired by said wearable device and (ii) environmental audio included in the first audio information of each response received by said communication unit, and
   said same conversation group detection unit detects the group-participant wearable device that belongs to the same conversation group further with use of a result of the comparison.

8. The wearable device of claim 4, wherein
   each of the responses further includes first orientation information,
   said wearable device further comprises:
   an orientation change amount calculation unit operable to calculate an orientation change amount of said wearable device and each of the other wearable devices with use of second orientation information of said wearable device and the first orientation information included in the responses received from the other wearable devices, and
   said same conversation group detection unit detects the other wearable that belongs to the same conversation group further with use of the calculated orientation change amounts.

9. The wearable device of claim 8, wherein
   said same conversation group detection unit detects, as the group-participant wearable device in the same conversation group, the group-participant wearable device for which (i) the overlap rate pertaining thereto is less than or equal to a first threshold value, (ii) the distance pertaining thereto is less than or equal to a second threshold value, and (iii) a difference between the orientation change amount of said wearable device and the orientation change amount of the group-participant wearable device targeted for detection is in a predetermined range.

10. The wearable device of claim 1, wherein data that has been acquired by the other wearable devices is used as components for a profile.

11. The wearable device of claim 10, wherein said wearable device creates the profile, and said communication unit is further operable to transmit the created profile to the other wearable devices.

12. The wearable device of claim 10, wherein the data includes image data and/or audio data.

13. The wearable device of claim 10, further comprising: a recording unit operable to record the data.

14. A method used by a wearable device, comprising the steps of:
   requesting that each of a plurality of other wearable devices transmit a response including first audio information acquired by the other wearable devices;
   receiving the responses from the plurality of other wearable devices; and
   calculating an overlap rate between (i) an utterance interval in second audio information acquired by the wearable device at the same time and location the first audio information is acquired by the other wearable devices and (ii) an utterance interval in the first audio information acquired and received by each of the other wearable devices, wherein
   with use of at least the calculated overlap rates, a group-participant wearable device that belongs to a same conversation group as the wearable device is detected from among the plurality of other wearable devices.

15. A non-transitory computer-readable storage medium having recorded thereon a program that is used by a wearable device and is for causing a computer to execute the steps of:
   requesting each of a plurality of other wearable devices to transmit a response including first audio information acquired by the other wearable devices;
   receiving the responses from the plurality of other wearable devices; and
   calculating an overlap rate between (i) an utterance interval in second audio information acquired by the wearable device at the same time and location the first audio information is acquired by the other wearable devices and (ii) an utterance interval in the first audio information acquired and received by each of the wearable devices, wherein
   with use of at least the calculated overlap rates, a group-participant wearable device that belongs to a same conversation group as the wearable device is detected from among the plurality of other wearable devices.

16. A server apparatus that performs communication with a plurality of wearable devices, the server apparatus comprising:
   a communication unit operable to receive information including audio information from each of the wearable devices; and
   a conversation group detection unit operable to calculate overlap rates between (i) an utterance interval in first audio information acquired by a first one of the wearable devices and (ii) an utterance interval in second audio information acquired by other wearable devices at the same time and location as the first audio information is acquired by the first one of the wearable devices, and detect a plurality of conversation groups with use of the calculated overlap rates.

17. The server apparatus of claim 16, wherein the information received from each of the wearable devices further includes location information, said conversation group detection unit includes,
   a clustering subunit operable to, when the conversation group detection unit is detecting a plurality of conversation groups, divide the plurality of wearable devices into a predetermined number of clusters with use of the location information received from each of the wearable devices,
   an utterance information generation subunit operable to generate utterance information for each speaker in each of the conversation groups, and
   a compatibility rate calculation subunit operable to calculate a conversation group compatibility rate with use of the generated utterance information, and
   in each of the clusters, if a wearable device does not belong to any of the conversation groups, said conversation group detection unit determines to which conversation group said wearable device should belong, with use of the calculated conversation group compatibility rate.

* * * * *